(12) United States Patent
Ukai

(10) Patent No.: US 10,387,118 B2
(45) Date of Patent: Aug. 20, 2019

(54) ARITHMETIC OPERATION UNIT AND METHOD OF CONTROLLING ARITHMETIC OPERATION UNIT

(71) Applicant: FUJITSU LIMITED, Kawasaki-shi, Kanagawa (JP)

(72) Inventor: Masaki Ukai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/878,453

(22) Filed: Jan. 24, 2018

(65) Prior Publication Data
US 2018/0267776 A1 Sep. 20, 2018

(30) Foreign Application Priority Data

Mar. 16, 2017 (JP) ................................. 2017-051464

(51) Int. Cl.
G06F 7/501 (2006.01)
G06F 7/544 (2006.01)
G06F 17/14 (2006.01)

(52) U.S. Cl.
CPC ............ G06F 7/501 (2013.01); G06F 7/5443 (2013.01); G06F 17/142 (2013.01)

(58) Field of Classification Search
CPC ........................ G06F 7/5443; G06F 17/14–142
USPC .................................................... 708/409
See application file for complete search history.

(56) References Cited

U.S. PATENT DOCUMENTS

| 5,717,620 A * | 2/1998 | Williams ............. G06F 17/142 708/403 |
| 5,941,940 A | 8/1999 | Prasad et al. |
| 9,559,886 B2 * | 1/2017 | Xiao ..................... G06F 17/142 |
| 2003/0009502 A1 | 1/2003 | Katayanagi |
| 2004/0015530 A1 * | 1/2004 | Kang ..................... G06F 17/142 708/404 |
| 2008/0307029 A1 | 12/2008 | Kan |
| 2015/0006604 A1 * | 1/2015 | Ng ......................... G06F 17/142 708/404 |
| 2016/0210146 A1 * | 7/2016 | Li ........................ G06F 17/142 |

FOREIGN PATENT DOCUMENTS

| JP | 11-85466 | 3/1999 |
| JP | 2003-16051 | 1/2003 |
| WO | 2007/094047 | 8/2007 |

* cited by examiner

Primary Examiner — Matthew D Sandifer
(74) Attorney, Agent, or Firm — Fujitsu Patent Center

(57) ABSTRACT

An arithmetic operation unit includes: a first multiplier configured to multiply two first input data to calculate first arithmetic data; a second multiplier configured to multiply two second input data to calculate second arithmetic data; a first adder configured to add the first arithmetic data and the second arithmetic data to calculate third arithmetic data; a first arithmetic selector configured to select one of the first arithmetic data and the third arithmetic data; a second arithmetic selector configured to select one of the second arithmetic data and the third arithmetic data; a second adder configured to add third input data and arithmetic data selected by the first arithmetic selector to calculate first arithmetic result data; and a third adder configured to add input fourth data and arithmetic data selected by the second arithmetic selector to calculate second arithmetic result data.

7 Claims, 16 Drawing Sheets

ARITHMETIC OPERATION UNIT AND METHOD OF CONTROLLING ARITHMETIC OPERATION UNIT

CROSS-REFERENCE TO RELATED APPLICATION

This application is based upon and claims the benefit of priority of the prior Japanese Patent Application No. 2017-051464, filed on Mar. 16, 2017, the entire contents of which are incorporated herein by reference.

FIELD

The embodiments discussed herein are related to an arithmetic operation unit and method of controlling an arithmetic operation unit.

BACKGROUND

A processor such as, for example, a central processing unit (CPU) includes an arithmetic operation unit that implements arithmetic operation.

Related techniques are disclosed in Domestic Re-publication of PCT International Publication for Patent Application No. 2007-094047 and Japanese Laid-open Patent Publication Nos. 11-85466 and 2003-16051.

SUMMARY

According to an aspect of the embodiments, an arithmetic operation unit includes: a first multiplier configured to multiply two first input data to calculate first arithmetic data; a second multiplier configured to multiply two second input data to calculate second arithmetic data; a first adder configured to add the first arithmetic data and the second arithmetic data to calculate third arithmetic data; a first arithmetic selector configured to select one of the first arithmetic data and the third arithmetic data; a second arithmetic selector configured to select one of the second arithmetic data and the third arithmetic data; a second adder configured to add third input data and arithmetic data selected by the first arithmetic selector to calculate first arithmetic result data; and a third adder configured to add input fourth data and arithmetic data selected by the second arithmetic selector to calculate second arithmetic result data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, a general purpose processor includes an arithmetic operation unit that implements, for example, product-sum operation, and implements, for example, signal processing that uses the Fast Fourier Transform (FFT) using the product-sum operation. For example, the processor includes an arithmetic operation unit specific for implementation of the FFT. The processor of this type implements butterfly arithmetic operation that is a basic arithmetic operation in the FFT.

In an arithmetic operation unit of the general purpose processor, arithmetic efficiency in implementing the butterfly arithmetic operation is low compared with an arithmetic operation unit specific to implementation of the FFT. In the arithmetic operation unit specific to implementation of the FFT, operation versatility is low compared with the arithmetic operation unit of the general purpose processor. For example, in some cases, the arithmetic operation unit specific to implementation of the FFT may not be suitable for operations other than the butterfly arithmetic operation. In this case, arithmetic efficiency in implementing an arithmetic operation other than the butterfly arithmetic operation drops.

For example, an arithmetic operation unit having a high arithmetic efficiency may be provided.

Figure 1:
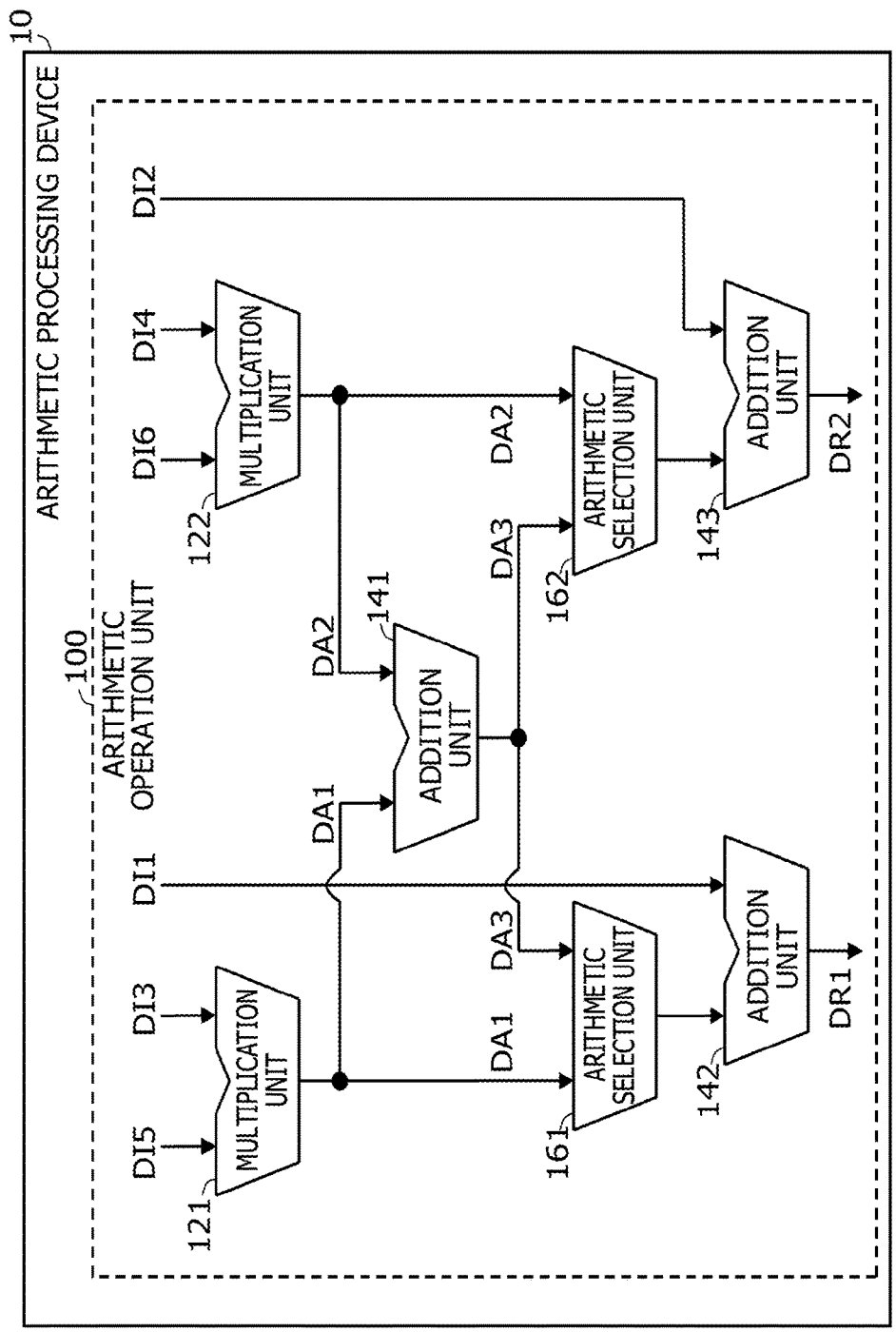
FIG. 1 illustrates an embodiment of an arithmetic operation unit and a method of controlling the arithmetic operation unit.

FIG. 1 illustrates an embodiment of an arithmetic operation unit and a method of controlling the arithmetic operation unit. An arithmetic operation unit 100 illustrated in FIG. 1 is included in an arithmetic processing device 10 that is a processor such as, for example, a CPU. The arithmetic operation unit 100 implements arithmetic operation using a plurality of input data DI (DI1, DI2, DI3, DI4, DI5, DI6). The plurality of input data DI, which are targets of arithmetic operation, are held in a holding unit. The number of input data DI is not limited to six. The arithmetic processing device 10 is configured to implement an arithmetic operation using the arithmetic operation unit 100 according to an instruction. The arithmetic operation unit 100 includes multiplication units 121 and 122, addition units 141, 142, and 143, and arithmetic selection units 161 and 162.

The multiplication unit 121 is configured to receive input data DI3 and DI5 among the plurality of input data DI. Then, the multiplication unit 121 is configured to multiply input data DI3 and input data DI5 and output multiplication result DA1 (hereinafter alternatively referred to as arithmetic data DA1) to the addition unit 141 and the arithmetic selection unit 161. The multiplication unit 121 may be an example of a first multiplication unit that calculates first arithmetic data DA1 by multiplying two input data DI.

The multiplication unit 122 is configured to receive input data DI4 and DI6 among the plurality of input data DI. Then, the multiplication unit 122 is configured to multiply input data DI4 and input data DI6 and output multiplication result DA2 (hereinafter alternatively referred to as arithmetic data DA2) to the addition unit 141 and the arithmetic selection unit 162. The multiplication unit 122 may be an example of a second multiplication unit that calculates second arithmetic data DA2 by multiplying two input data DI.

The addition unit 141 is configured to add arithmetic data DA1 and arithmetic data DA2 and output addition result DA3 (hereinafter alternatively referred to as arithmetic data DA3) to arithmetic selection units 161 and 162. The addition unit 141 is an example of a first addition unit that adds first arithmetic data DA1 and second arithmetic data DA2 to calculate third arithmetic data DA3. Addition that addition units 141, 142, and 143 implement includes both addition of two data and subtraction of one data from the other one of two data. For example, result of the subtraction of one data from the other one of two data is obtained by making one of the two data negative and then adding together. The addition unit 141 is configured to implement either addition or subtraction based on the content of arithmetic operation implemented by the arithmetic operation unit 100. Hereinafter, "addition" and "subtraction" are not distinguished from each other particularly, and may be referred to as "addition".

The arithmetic selection unit 161 is configured to select either arithmetic data DA1 or DA3 based on the content of arithmetic operation implemented by the arithmetic operation unit 100, and output selected arithmetic data DA to the addition unit 142. The arithmetic selection unit 161 is an example of a first arithmetic selection unit that selects either first arithmetic data DA1 or third arithmetic data DA3.

For example, when the arithmetic operation unit 100 implements the butterfly arithmetic operation that is a basic arithmetic operation in the FFT, the arithmetic selection unit 161 outputs arithmetic data DA3 out of arithmetic data DA1 and DA3 to the addition unit 142. The butterfly arithmetic operation is, for example, an arithmetic operation that calculates a pair of unit arithmetic operations Fp and Fm represented by Formula (1) and Formula (2) described later.

For example, when the arithmetic operation unit 100 implements an arithmetic operation other than the butterfly arithmetic operation (for example, product-sum operation), the arithmetic selection unit 161 outputs arithmetic data DA1 out of arithmetic data DA1 and DA3 to the addition unit 142. In this case, the processor including the multiplication unit 121 and the addition unit 142 functions as an arithmetic operation unit implementing the product-sum operation.

The arithmetic selection unit 162 is configured to select either arithmetic data DA2 or DA3 based on the content of arithmetic operation implemented by the arithmetic operation unit 100, and output selected arithmetic data DA to the addition unit 143. The arithmetic selection unit 162 is an example of a second arithmetic selection unit that selects either second arithmetic data DA2 or third arithmetic data DA3.

For example, when the arithmetic operation unit 100 implements the butterfly arithmetic operation, the arithmetic selection unit 162 outputs arithmetic data DA3 to the addition unit 142, and when the arithmetic operation unit 100 implements an arithmetic operation other than the butterfly arithmetic operation, the arithmetic selection unit 162 outputs arithmetic data DA2 to the addition unit 143. When the arithmetic selection unit 162 outputs arithmetic data DA2 to the addition unit 143, the processor including the multiplication unit 122 and the addition unit 143 functions as an arithmetic operation unit implementing the product-sum operation. More specifically, two product-sum operations may be implemented in parallel using multiplication units 121 and 122 and addition units 142 and 143.

The addition unit 142 is configured to add input data DI1 out of the plurality of input data DI and arithmetic data DA received from the arithmetic selection unit 161, and output addition result DR1 (hereinafter alternatively referred to as arithmetic result data DR1) to, for example, a register (not illustrated). The addition unit 142 is an example of a second addition unit that calculates first arithmetic result data DR1 by adding input data DI1 and arithmetic data DA selected by a first arithmetic selection unit 161. The addition unit 142 is configured to implement either addition or subtraction based on the content of arithmetic operation implemented by the arithmetic operation unit 100 in the same manner as the addition unit 141.

The addition unit 143 is configured to add input data DI2 out of the plurality of input data DI and arithmetic data DA received from the arithmetic selection unit 162, and output addition result DR2 (hereinafter alternatively referred to as arithmetic result data DR2) to, for example, a register (not illustrated). The addition unit 143 is an example of a third addition unit that adds input data DI2 and arithmetic data DA selected by a second arithmetic selection unit 162 to calculate second arithmetic result data DR2. The addition unit 143 is configured to implement either addition or subtraction based on the content of arithmetic operation that the arithmetic operation unit 100 implements, in the same manner as addition units 141 and 142.

Operation of the arithmetic operation unit 100 is described using implementation of the butterfly arithmetic operation as an example. The pair of unit arithmetic operations Fp and Fm in the butterfly arithmetic operation are represented by Formula (1) and Formula (2) using complex numbers c1 and c2 and a rotor Wt.

$$Fp = c1 + c2 \times Wt \quad (1)$$

$$Fm = c1 - c2 \times Wt \quad (2)$$

In the butterfly arithmetic operation in the FFT of a point N (N is, for example, a power of 2), the rotor Wt is represented by "exp $((2\pi t/N)i)$".

Therefore, assuming that $c1 = a1 + b1 \times i$, $c2 = a2 + b2 \times i$, and $Wt = c3 = a3 + b3 \times i$, Formula (1) and Formula (2) are modified to Formula (3) and Formula (4) respectively. c3 is a complex number, and a1, a2, a3, b1, b2, and b3 are real numbers represented by numeric representation of the computer such as, for example, a floating point number or a fixed point number.

$$Fp = (a1 + (a2 \times a3 - b2 \times b3)) + i(b1 + (a2 \times b3 + a3 \times b2)) \quad (3)$$

$$Fm = (a1 - (a2 \times a3 - b2 \times b3)) + i(b1 - (a2 \times b3 + a3 \times b2)) \quad (4)$$

For example, when calculating a real part of the pair of unit arithmetic operations Fp and Fm, the holding unit (not illustrated) of the arithmetic operation unit 100 holds real numbers a1, a1, a3, b3, a2, and b2 as input data DI1, DI2, DI3, DI4, DI5, and DI6 respectively. In this case, the multiplication unit 121 calculates "a2×a3" as arithmetic data DA1, and multiplication unit 122 calculates "b2×b3" as arithmetic data DA2. The addition unit 141 calculates "a2×a3−b2 b3" as arithmetic data DA3. Arithmetic selection units 161 and 162 select arithmetic data DA3. Thus, addition unit 142 calculates "a1+(a2×a3−b2×b3)" as arithmetic result data DR1. The addition unit 143 calculates "a1−(a2×a3−b2×b3)" as arithmetic result data DR2. Thus, real parts of the pair of unit arithmetic operations Fp and Fm are calculated as arithmetic result data DR1 and DR2 respectively.

When calculating a imaginary part of the pair of unit arithmetic operations Fp and Fm, the holding unit (not illustrated) of the arithmetic operation unit 100 holds real numbers b1, b1, b3, a3, a2, and b2 as input data DI1, DI2, DI3, DI4, DI5, and DI6 respectively. In this case, the multiplication unit 121 calculates "a2×b3" as arithmetic data DA1, and multiplication unit 122 calculates "a3×b2" as arithmetic data DA2. The addition unit 141 calculates "a2×b3+a3 b2" as arithmetic data DA3. Arithmetic selection units 161 and 162 select arithmetic data DA3. Thus, addition unit 142 calculates "b1+(a2×b3+a3×b2)" as arithmetic result data DR1. The addition unit 143 calculates "b1−(a2×b3+a3×b2)" as arithmetic result data DR2. Thus, imaginary parts of the pair of unit arithmetic operations Fp and Fm are calculated as arithmetic result data DR1 and DR2 respectively.

Thus, the arithmetic operation unit 100 may calculate the pair of unit arithmetic operations Fp and Fm by implementing arithmetic operation used in multiplication units 121 and 122 and addition units 141, 142, and 143 twice with replacement of input data DI.

Meanwhile, when calculating, for example, "a2×a3−b2×b3" that is a part of real parts of the pair of unit arithmetic operations Fp and Fm, an arithmetic operation unit not including the addition unit 141 and arithmetic selection units 161 and 162 first calculates either one of "a2×a3" and "b2×b3". Then, the arithmetic operation unit feeds back the calculated multiplication result (one of "a2×a3" and "b2×b3") to, for example, input data DI1 to calculate "a2×a3−b2×b3". For this reason, arithmetic efficiency (such as, for example, throughput) in implementing the butterfly arithmetic operation in an arithmetic operation unit not including the addition unit 141 and arithmetic selection units 161 and 162 is low compared with the arithmetic operation unit 100. In other words, the arithmetic operation unit 100 improves arithmetic efficiency in implementing the butterfly arithmetic operation compared with an arithmetic operation unit not including the addition unit 141 and arithmetic selection units 161 and 162.

Configuration of the arithmetic operation unit 100 is not limited to the embodiment illustrated in FIG. 1. For example, the arithmetic operation unit 100 may include an input selection unit configured to output either one of input data DI1 and DI2 to the addition unit 142. Also, the arithmetic operation unit 100 may include an input selection unit configured to output either one of input data DI1 and DI2 to the addition unit 143.

Figure 2:
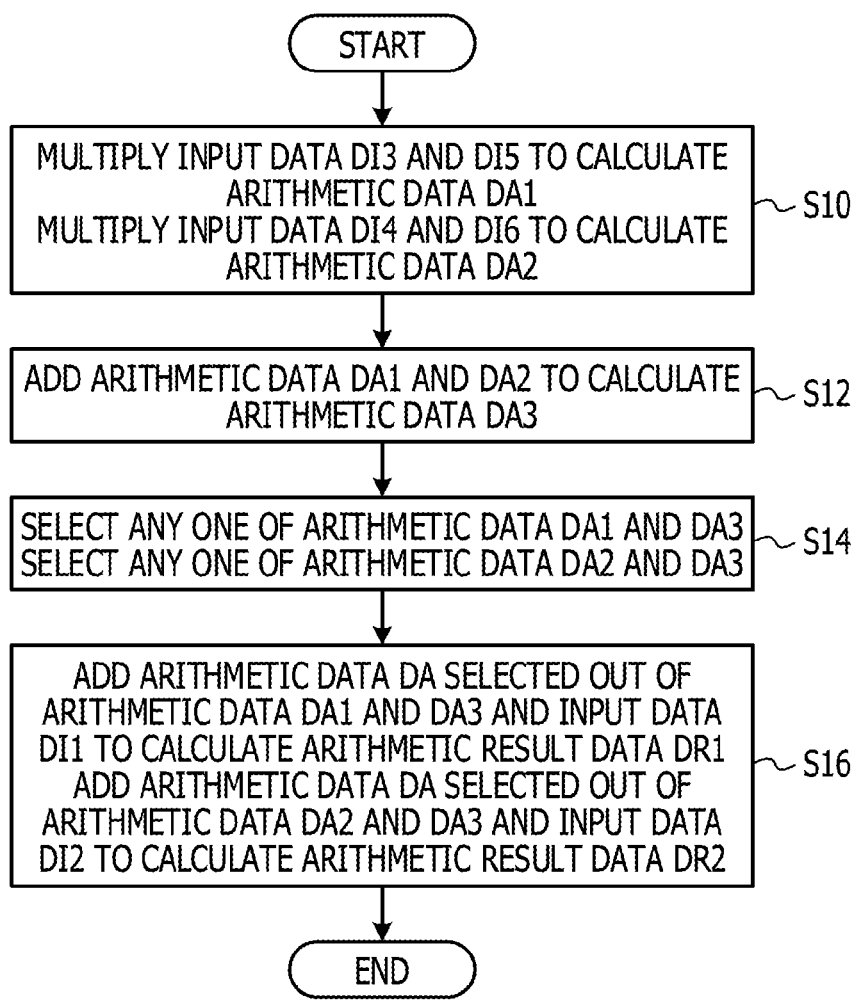
FIG. 2 illustrates an example of operations of the arithmetic operation unit illustrated in FIG. 1.

FIG. 2 illustrates an example of operations of the arithmetic operation unit illustrated in FIG. 1. Operations illustrated in FIG. 2 are an aspect of the method of controlling the arithmetic operation unit. Operations of the arithmetic operation unit 100 are not limited to the example illustrated in FIG. 2.

In the operation S10, the multiplication unit 121 multiplies input data DI3 and DI5 to calculate arithmetic data DA1, and the multiplication unit 122 multiplies input data DI4 and DI6 to calculate arithmetic data DA2.

In the operation S12, the addition unit 141 adds arithmetic data DA1 and DA2 to calculate arithmetic data DA3.

In the operation S14, the arithmetic selection unit 161 selects either arithmetic data DA1 or DA3 based on the content of arithmetic operation that the arithmetic operation unit 100 implements, and the arithmetic selection unit 162 selects either arithmetic data DA2 or DA3. For example, when the arithmetic operation unit 100 implements the butterfly arithmetic operation, arithmetic selection units 161 and 162 select arithmetic data DA3. When the arithmetic operation unit 100 implements an arithmetic operation other than the butterfly arithmetic operation, the arithmetic selection units 161 selects arithmetic data DA1, and the arithmetic selection unit 162 selects arithmetic data DA2.

In the operation S16, the addition unit 142 adds arithmetic data DA selected by the arithmetic selection unit 161 out of arithmetic data DA1 and DA3, and input data DI1 to calculate arithmetic result data DR1. The addition unit 143 adds arithmetic data DA selected by the arithmetic selection unit 162 out of arithmetic data DA2 and DA3, and input data DI2 to calculate arithmetic result data DR2.

For example, when the arithmetic operation unit 100 implements the butterfly arithmetic operation, the addition unit 142 receives input data DI1 and arithmetic data DA3, and the addition unit 143 receives input data DI2 and arithmetic data DA3. Then, the addition unit 142 adds input data DI1 and arithmetic data DA3 to calculate arithmetic result data DR1, and the addition unit 143 adds input data DI2 and arithmetic data DA3 to calculate arithmetic result data DR2. Thus, as arithmetic selection units 161 and 162 select arithmetic data DA3, the arithmetic operation unit 100 does not have to feedback multiplication result of, for example, the multiplication unit 121, and thereby improves efficiency of the butterfly arithmetic operation.

When the arithmetic operation unit 100 implements an arithmetic operation other than the butterfly arithmetic operation, the addition unit 142 receives input data DI1 and arithmetic data DA1, and the addition unit 143 receives input data DI2 and arithmetic data DA2. Then, the addition unit 142 adds input data DI1 and arithmetic data DA1 to calculate arithmetic result data DR1, and the addition unit 143 adds input data DI2 and arithmetic data DA2 to calculate arithmetic result data DR2. Thus, as arithmetic selection units 161 and 162 select arithmetic data DA1 and DA2 respectively, the arithmetic operation unit 100 also implements operations other than the butterfly arithmetic operation efficiently. For example, the arithmetic operation unit 100 may implement two product-sum operations in parallel.

In FIGS. 1 and 2, the addition unit 141 adds arithmetic data DA1 that is a multiplication result of the multiplication unit 121, and arithmetic data DA2 that is a multiplication result of the multiplication unit 122 to calculate arithmetic data DA3. Then, the arithmetic selection unit 161 outputs either arithmetic data DA1 or DA3 based on the content of arithmetic operation that the arithmetic operation unit 100 implements to the addition unit 142, and the arithmetic selection unit 162 outputs either arithmetic data DA2 or DA3 to the addition unit 143. The addition unit 142 adds input data DI1 and arithmetic data DA received from the arithmetic selection unit 161 to calculate arithmetic result data DR1. Also, the addition unit 143 adds input data DI2 and arithmetic data DA received from the arithmetic selection unit 162 to calculate arithmetic result data DR2.

Thus, addition units 142 and 143 receive arithmetic data DA corresponding to the content of the arithmetic operation that the arithmetic operation unit 100 implements respectively from arithmetic selection units 161 and 162. This enables to suppress drop of the arithmetic efficiency in implementing an arithmetic operation other than the butterfly arithmetic operation, and improve the arithmetic efficiency in implementing the butterfly arithmetic operation. As a result, the arithmetic efficiency of the arithmetic operation unit 100 may be improved.

Figure 3:
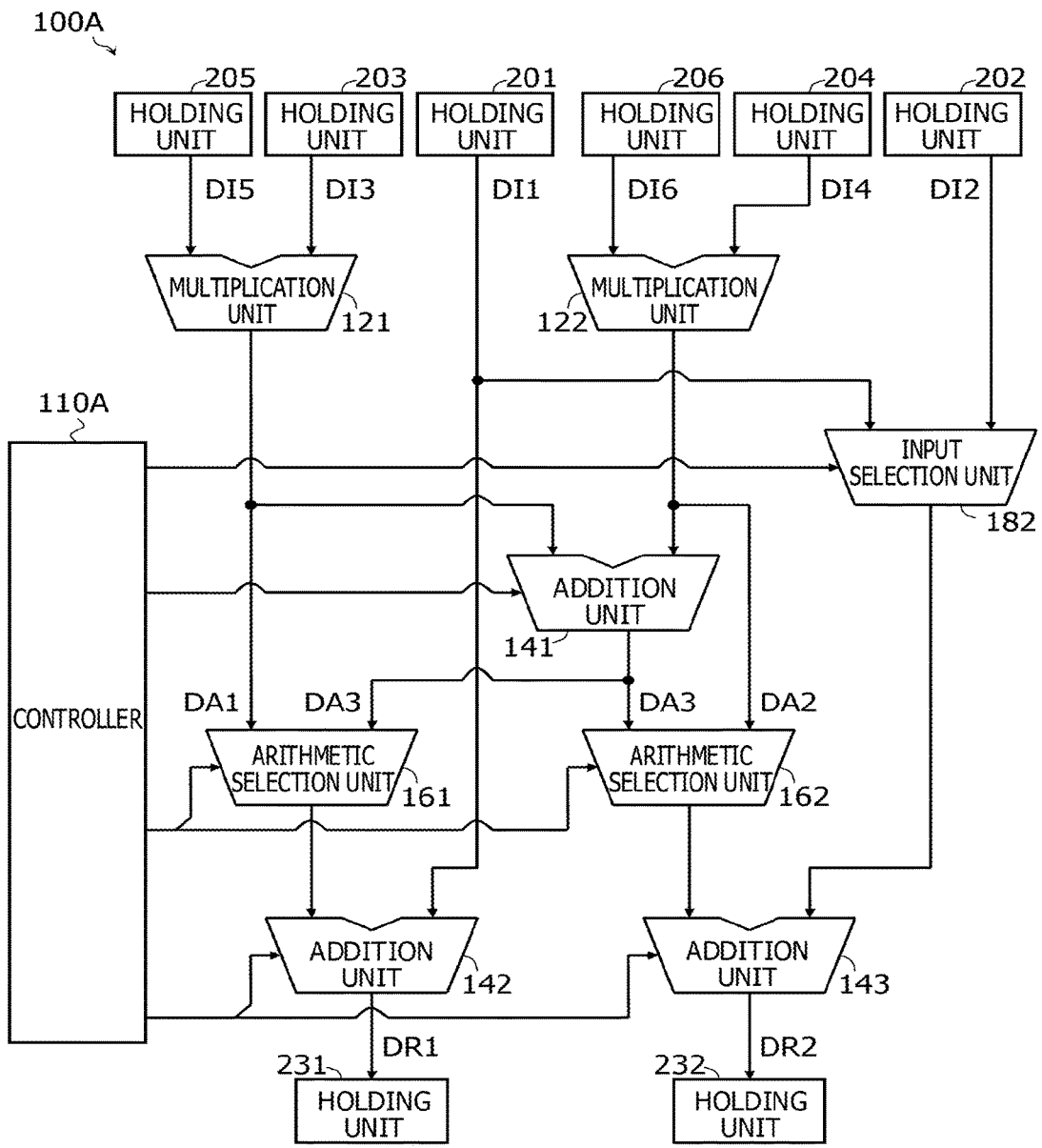
FIG. 3 illustrates another embodiment of an arithmetic operation unit and a method of controlling the arithmetic operation unit.

FIG. 3 illustrates an embodiment of the arithmetic operation unit and the method of controlling the arithmetic operation unit. Elements identical or similar with elements described with reference to FIG. 1 are assigned with identical or similar reference numerals, and detailed description thereof is omitted. An arithmetic operation unit 100A illustrated in FIG. 3 is configured to implement arithmetic operation using a plurality of input data DI (DI1, DI2, DI3, DI4, DI5, DI6). Although not illustrated in FIG. 2, the arithmetic operation unit 100A is included in the arithmetic processing device 10 that is a processor such as, for example, a CPU, in the same manner as the arithmetic operation unit 100 illustrated in FIG. 1.

The arithmetic operation unit 100A is identical or similar with the arithmetic operation unit 100 illustrated in FIG. 1 except that a controller 110A, an input selection unit 182, and holding units 201, 202, 203, 204, 205, 206, 231, and 232 are added to the arithmetic operation unit 100 illustrated in FIG. 1. The arithmetic operation unit 100A includes a controller 110A, multiplication units 121 and 122, addition units 141, 142, and 143, arithmetic selection units 161 and 162, an input selection unit 182, and holding units 201 to 206, 231, and 232.

A plurality of holding units 201 to 206 respectively hold a plurality of input data DI that is a target of the arithmetic operation. The holding unit 201 is an example of a first holding unit; the holding unit 202 is an example of a second holding unit; the holding unit 203 is an example of a third holding unit; the holding unit 204 is an example of a fourth holding unit; the holding unit 205 is an example of a fifth holding unit; and the holding unit 206 is an example of a sixth holding unit. In the embodiment illustrated in FIG. 3, input data DI1 that the holding unit 201 holds is outputted to the addition unit 142 and the input selection unit 182, and input data DI2 that the holding unit 202 holds is outputted to the input selection unit 182. Input data DI3 that the holding unit 203 holds and input data DI5 that the holding unit 205 holds are outputted to the multiplication unit 121, and input data DI4 that the holding unit 204 holds and input data DI6 that the holding unit 206 holds are outputted to the multiplication unit 122.

The controller 110A controls operations of addition units 141, 142, and 143, arithmetic selection units 161 and 162, and an input selection unit 182 based on the content of the arithmetic operation that the arithmetic operation unit 100A implements. For example, based on the content of operations that the arithmetic operation unit 100A implements, the controller 110A instructs each of addition units 141, 142, and 143 to implement addition of adding two data or implement subtraction of subtracting either one of the two data from the other. Thus, addition units 141, 142, and 143 implements either addition or subtraction based on the content of operations that the arithmetic operation unit 100A implements. Also, the controller 110A controls selection operations by the input selection unit 182 and arithmetic selection units 161 and 162 based on the content of operations that the arithmetic operation unit 100A implements.

The input selection unit 182 selects either input data DI1 or DI2 based on the control from the controller 110A, and outputs selected input data DI to the addition unit 143. For example, when the arithmetic operation unit 100A implements the butterfly arithmetic operation that is a basic arithmetic operation in the FFT, the input selection unit 182 outputs input data DI1 out of input data DI1 and DI2 to the addition unit 143 based on the control from the controller 110A. Thus, the addition unit 143 receives input data DI1 in the same manner as the addition unit 142. In this case, input data DI2 that the holding unit 202 holds is not used in the arithmetic operation. Thus, processing of storing input data DI2 into the holding unit 202 may be saved. When the arithmetic operation unit 100A implements an arithmetic operation other than the butterfly arithmetic operation, the input selection unit 182 outputs input data DI2 out of input data DI1 and DI2 to the addition unit 143 based on the control from the controller 110A.

More specifically, the input selection unit 182 outputs either input data DI1 or DI2 to the addition unit 143 based on the content of arithmetic operation that the arithmetic operation unit 100A implements. By this operation, out of input data DI1 and DI2, input data DI used by the addition unit 143 is transferred to the addition unit 143. Thus, the input selection unit 182 selects input data DI used by a third addition unit 143 out of two input data DI1 and DI2 that are received respectively from two holding units 201 and 202 out of the plurality of holding units 201 to 206.

The multiplication unit 121 multiplies input data DI3 received from the holding unit 203 and input data DI5 received from the holding unit 205. The multiplication unit 122 multiplies input data DI4 received from the holding unit 204 and input data DI6 received from the holding unit 206. The addition unit 141 adds arithmetic data DA1 and arithmetic data DA2 based on the control received from the controller 110A. The arithmetic selection unit 161 outputs either arithmetic data DA1 or DA3 to the addition unit 142 based on the control from the controller 110A. The arithmetic selection unit 162 outputs either arithmetic data DA2 or DA3 to the addition unit 143 based on the control from the controller 110A.

The addition unit 142 adds input data DI1 received from the holding unit 201 and arithmetic data DA received from the arithmetic selection unit 161 based on the control from the controller 110A. The addition unit 143 adds input data DI received from the input selection unit 182 and arithmetic data DA received from the arithmetic selection unit 162 based on the control from the controller 110A. The holding unit 231 holds arithmetic result data DR1 that is an addition result of the addition unit 142, and the holding unit 232 holds arithmetic result data DR2 that is an addition result of the addition unit 143.

Thus, in the arithmetic operation unit 100A, the controller 110A controls operations of addition units 141, 142, and 143, and arithmetic selection units 161 and 162, and selects input data DI that the input selection unit 182 outputs to the addition unit 143. Other operations of the arithmetic operation unit 100A are identical or similar with operations illustrated in FIG. 2 (operations of the arithmetic operation unit 100 illustrated in FIG. 1).

Configuration of the arithmetic operation unit 100A is not limited to the embodiment illustrated in FIG. 1. For example, the arithmetic operation unit 100A may include an input selection unit configured to output either one of input data DI1 and DI2 to the addition unit 142.

Similar effects as in the embodiment illustrated in FIGS. 1 and 2 also may be obtained in FIG. 3. For example, addition units 142 and 143 receive arithmetic data DA corresponding to the content of the arithmetic operation that the arithmetic operation unit 100A implements respectively from arithmetic selection units 161 and 162. This enables to suppress drop of the arithmetic efficiency in implementing an arithmetic operation other than the butterfly arithmetic operation, and improve arithmetic efficiency in implementing the butterfly arithmetic operation. As a result, arithmetic efficiency of the arithmetic operation unit 100A may be improved.

When the arithmetic operation unit 100A implements the butterfly arithmetic operation that is a basic arithmetic operation in the FFT, the input selection unit 182 outputs input data DI1 out of input data DI1 and DI2 to the addition unit 143. By this operation, when the arithmetic operation unit 100A implements the butterfly arithmetic operation, processing of storing input data DI2 into the holding unit 202 may be saved.

Figure 4:
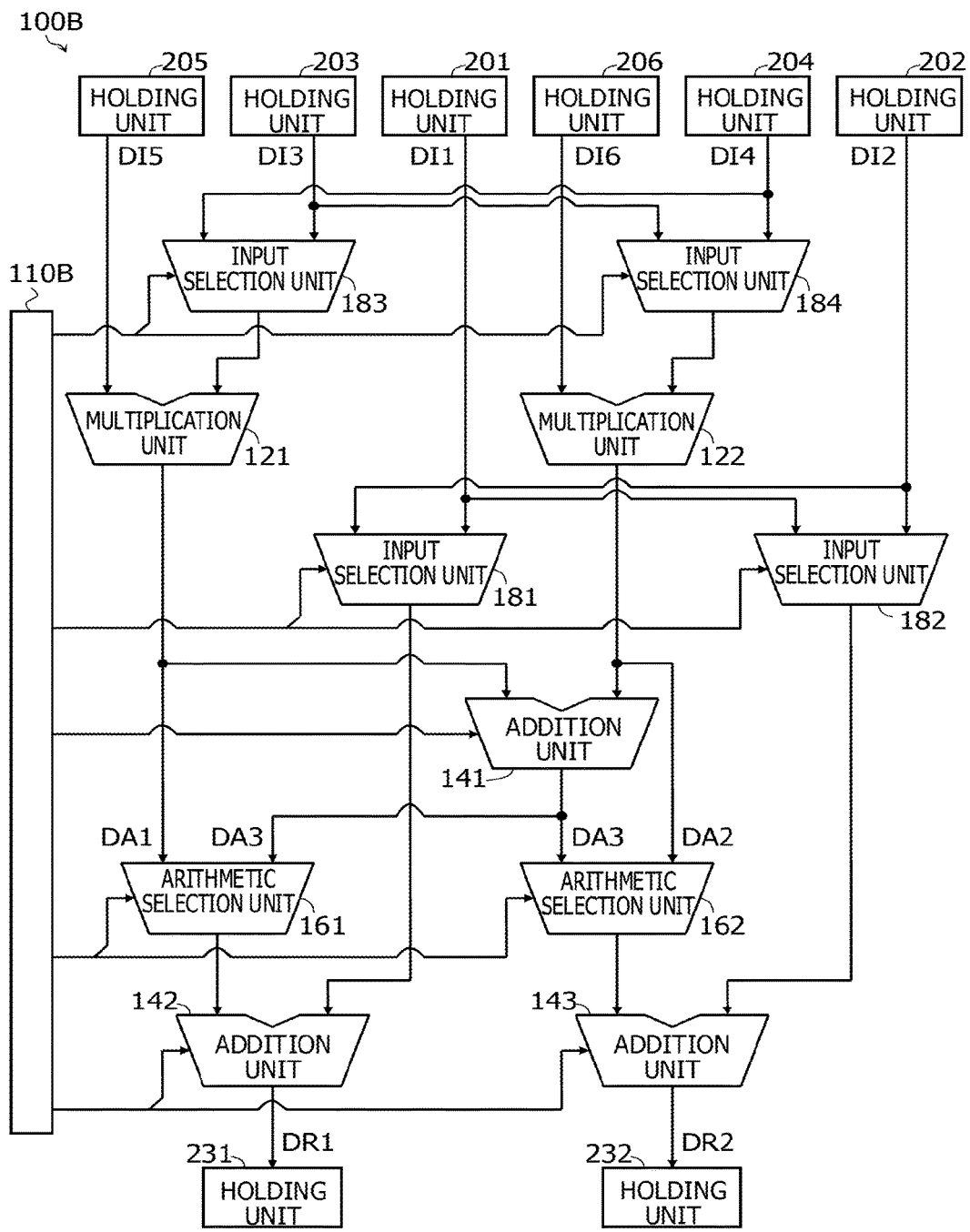
FIG. 4 illustrates another embodiment of an arithmetic operation unit and a method of controlling the arithmetic operation unit.

FIG. 4 illustrates an embodiment of the arithmetic operation unit and the method of controlling the arithmetic operation unit. Elements identical or similar with elements described with reference to FIGS. 1 to 3 are assigned with identical or similar reference numerals, and detailed description thereof is omitted. An arithmetic operation unit 100B illustrated in FIG. 4 is configured to implement arithmetic operation using a plurality of input data DI (DI1, DI2, DI3, DI4, DI5, DI6). Although not illustrated in FIG. 4, the arithmetic operation unit 100B is included in the arithmetic processing device 10 that is a processor such as, for example, a CPU, in the same manner as the arithmetic operation unit 100 illustrated in FIG. 1.

The arithmetic operation unit 100B includes a controller 110B in place of the controller 110A illustrated in FIG. 3, and input selection units 181, 183, and 184 are added to the arithmetic operation unit 100A illustrated in FIG. 3. Other configuration of the arithmetic operation unit 100B is identical or similar with the arithmetic operation unit 100A illustrated in FIG. 3.

The arithmetic operation unit 100B includes the controller 110B, multiplication units 121 and 122, addition units 141, 142, and 143, arithmetic selection units 161 and 162, input selection units 181, 182, 183, and 184, and holding units 201 to 206, 231, and 232. In the embodiment illustrated in FIG. 4, both input data DI1 that the holding unit 201 holds and input data DI2 that the holding unit 202 holds are outputted to input selection units 181 and 182. Both input data DI3 that the holding unit 203 holds and input data DI4 that the holding unit 204 holds are outputted to the input selection units 181 and 182. Then, input data DI5 that the holding unit 205 holds is outputted to the multiplication unit 121, and input data DI6 that the holding unit 206 holds is outputted to the multiplication unit 122.

The controller 110B is identical or similar with the controller 110A illustrated in FIG. 2 except that the controller 110B controls selection operations of input selection units 181, 183 and 184 based on the content of operations that the arithmetic operation unit 100B implements. More specifically, the controller 110B controls operations of addition units 141, 142, and 143, arithmetic selection units 161 and 162, and input selection units 181, 182, 183, and 184 based on the content of the arithmetic operation that the arithmetic operation unit 100B implements.

The input selection unit 181 selects either input data DI1 or DI2 based on the control from the controller 110B, and outputs the selected input data DI to the addition unit 142. The input selection unit 181 is an example of a first input selection unit that selects input data DI used in the second addition unit 142 out of two input data DI1 and DI2 that is received respectively from the first holding unit 201 and the second holding unit 202 out of the plurality of holding units 201 to 206.

The input selection unit 182 selects either input data DI1 or DI2 based on the control from the controller 110B, and outputs the selected input data DI to the addition unit 143. The input selection unit 182 is an example of a second input selection unit that selects input data DI used in the third addition unit 143 out of two input data DI1 and DI2 that is received respectively from the first holding unit 201 and the second holding unit 202.

The input selection unit 183 selects either input data DI3 or DI4 based on the control from the controller 110B, and outputs the selected input data DI to the multiplication unit 121. The input selection unit 183 is an example of a third input selection unit that selects input data DI used in the first multiplication unit 121 out of two input data DI3 and DI4 that is received respectively from the third holding unit 203 and the fourth holding unit 204 out of the plurality of holding units 201 to 206.

The input selection unit 184 selects either input data DI3 or DI4 based on the control from the controller 110B, and outputs the selected input data DI to the multiplication unit 122. The input selection unit 184 is an example of a fourth input selection unit that selects input data DI used in the second multiplication unit 121 out of two input data DI3 and DI4 that is received respectively from the third holding unit 203 and the fourth holding unit 204.

The arithmetic selection unit 161 outputs either arithmetic data DA1 or DA3 to the addition unit 142 based on the control from the controller 110B. The arithmetic selection unit 162 outputs either arithmetic data DA2 or DA3 to the addition unit 143 based on the control from the controller 110B.

For example, when the arithmetic operation unit 100B implements one butterfly arithmetic operation that is a basic arithmetic operation in the FFT twice, input selection units 181, 182, 183, and 184 and arithmetic selection units 161 and 162 operate as described below.

The input selection unit 181 alternately outputs input data DI1 received from the holding unit 201 and input data DI2 received from the holding unit 202 to the addition unit 142 in the first arithmetic operation and the second arithmetic operation. For example, the input selection unit 181 outputs input data DI1 received from the holding unit 201 to the addition unit 142 in the first arithmetic operation, and outputs input data DI2 received from the holding unit 202 to the addition unit 142 in the second arithmetic operation.

The input selection unit 182 outputs input data DI identical with input data DI that the input selection unit 181 outputs to the addition unit 142 out of input data DI1 received from the holding unit 201 and input data DI2 received from the holding unit 202 to the addition unit 143. For example, the input selection unit 182 outputs input data DI1 received from the holding unit 201 to the addition unit 143 in the first arithmetic operation, and outputs input data DI2 received from the holding unit 202 to the addition unit 143 in the second arithmetic operation.

The input selection unit 183 alternately outputs input data DI3 received from the holding unit 203 and input data DI4 received from the holding unit 204 to the multiplication unit 121 in the first and second arithmetic operations. For example, the input selection unit 183 outputs input data DI3 received from the holding unit 203 to the multiplication unit 121 in the first arithmetic operation, and outputs input data DI4 received from the holding unit 204 to the multiplication unit 121 in the second arithmetic operation.

The input selection unit 184 outputs input data DI different from input data DI that the input selection unit 183 outputs to the multiplication unit 121 out of input data DI3 received from the holding unit 203 and input data DI4 received from the holding unit 204 to the multiplication unit 122. For example, the input selection unit 184 outputs input data DI4 received from the holding unit 204 to the multiplication unit 122 in the first arithmetic operation, and outputs input data DI3 received from the holding unit 203 to the multiplication unit 122 in the second arithmetic operation.

The arithmetic selection unit 161 outputs arithmetic data DA3 received from the addition unit 141 to the addition unit 142, and the arithmetic selection unit 162 outputs arithmetic data DA3 received from the addition unit 141 to the addition unit 143. This enables to implement the butterfly arithmetic operation by operating the arithmetic operation unit 100B twice without replacing input data DI that holding units 201 to 206 hold in first and second arithmetic operations. Therefore, processing of replacing input data DI that holding units 201 to 206 hold may be saved, and thereby arithmetic efficiency may be improved compared with the case where input data DI that holding units 201 to 206 hold is replaced in first and second arithmetic operations.

For example, when the arithmetic operation unit 100B implements the product-sum operation, input selection units 181, 182, 183, and 184 and arithmetic selection units 161 and 162 operate as described below. The input selection unit 181 outputs input data DI1 received from the holding unit 201 to the addition unit 142, and the input selection unit 182 outputs input data DI2 received from the holding unit 202 to the addition unit 143. The input selection unit 183 outputs input data DI3 received from the holding unit 203 to the multiplication unit 121, and the input selection unit 184 outputs input data DI4 received from the holding unit 204 to the multiplication unit 122. The arithmetic selection unit 161 outputs arithmetic data DA1 received from the multiplication unit 121 to the addition unit 142, and the arithmetic selection unit 162 outputs arithmetic data DA2 received from the multiplication unit 122 to the addition unit 143.

The multiplication unit 121 multiplies input data DI received from the input selection unit 183 and input data DI5 received from the holding unit 205. The multiplication unit 122 multiplies input data DI received from the input selection unit 184 and input data DI6 received from the holding unit 206. The addition unit 141 adds arithmetic data DA1 and DA2 based on the control received from the controller 110B.

The addition unit 142 adds input data DI received from the input selection unit 181 and arithmetic data DA received from the arithmetic selection unit 161 based on the control from the controller 110B. The addition unit 143 adds input data DI received from the input selection unit 182 and arithmetic data DA received from the arithmetic selection unit 162 based on the control from the controller 110B. The holding unit 231 holds arithmetic result data DR1 that is an addition result of the addition unit 142, and the holding unit 232 holds arithmetic result data DR2 that is an addition result of the addition unit 143. Configuration of the arithmetic operation unit 100B is not limited to the embodiment illustrated in FIG. 4.

Figure 5:
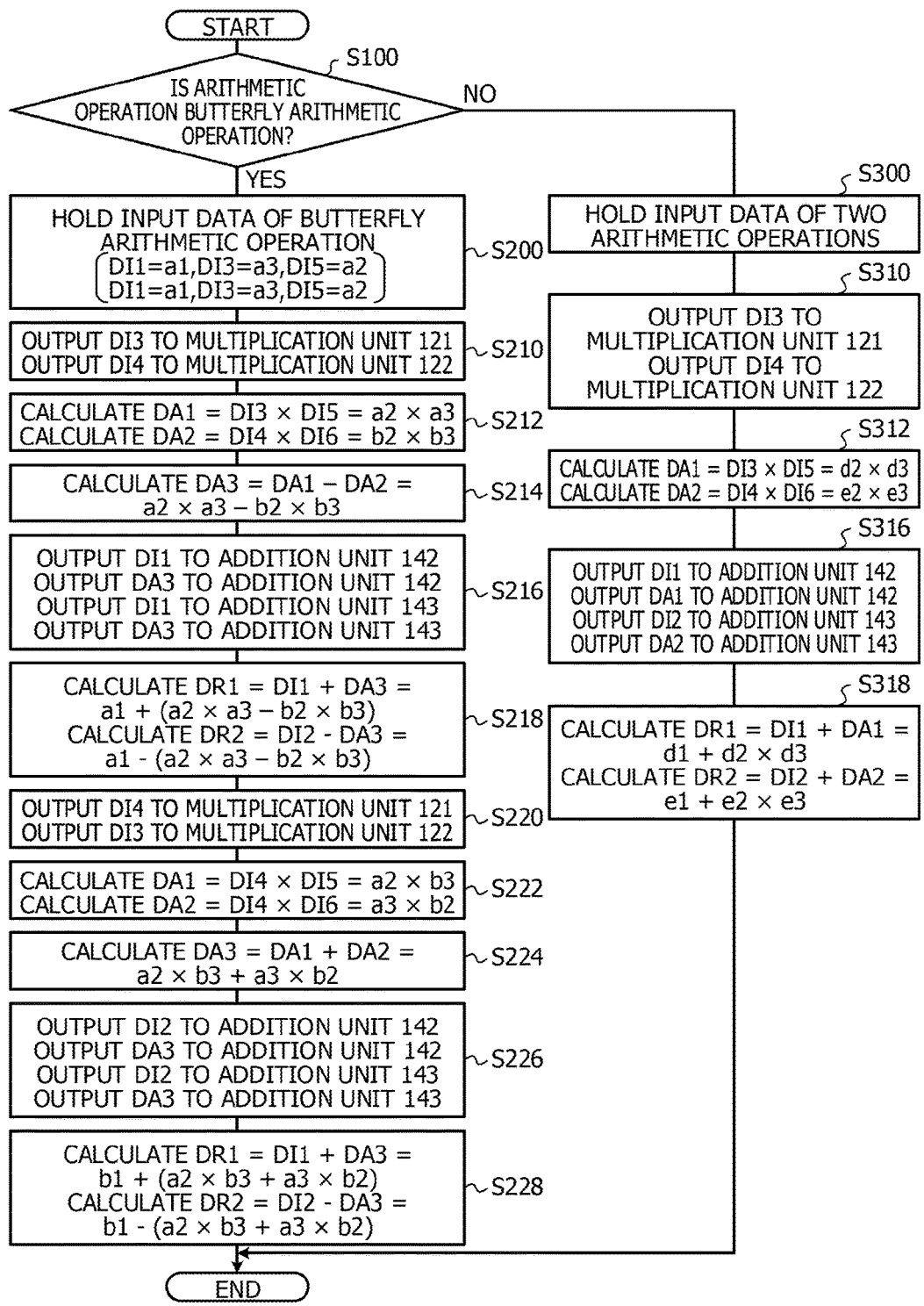
FIG. 5 illustrates an example of operations of the arithmetic operation unit illustrated in FIG. 4.

FIG. 5 illustrates an example of operations of the arithmetic operation unit illustrated in FIG. 4. Operations illustrated in FIG. 5 are an aspect of the method of controlling the arithmetic operation unit. a1, a2, a3, b1, b2, and b3 illustrated in FIG. 5 are real numbers a1, a2, a3, b1, b2, and b3 in Formula (3) and Formula (4) for a pair of unit arithmetic operations Fp and Fm in the butterfly arithmetic operation illustrated in paragraphs describing the arithmetic operation unit 100 illustrated in FIG. 1. d1, d2, d3, e1, e2, and e3 illustrated in FIG. 5 are real numbers represented by numeric representation of the computer such as, for example, a floating point number or a fixed point number in the same manner as real numbers a1 and so on. For example, a series of processings from the operation S200 to the operation S228 are implemented when implementing the butterfly arithmetic operation, and a series of processings from the operation S300 to the operation S318 are implemented when implementing an arithmetic operation other than the butterfly arithmetic operation (for example, product-sum operation).

In the operation S100, the controller 110B determines whether an arithmetic operation that the arithmetic operation unit 100B implements is the butterfly arithmetic operation. When an arithmetic operation implemented by the arithmetic operation unit 100B is the butterfly arithmetic operation, operation of the arithmetic operation unit 100B shifts to the operation S200. Meanwhile, when an arithmetic operation that the arithmetic operation unit 100B implements is an arithmetic operation other than the butterfly arithmetic operation, operation of the arithmetic operation unit 100B shifts to the operation S300.

In the operation S200, holding units 201 to 206 hold input data DI1 to DI6 of the butterfly arithmetic operation respectively. For example, input data DI1 is the real number a1 in the Formula (3) and the Formula (4) for the pair of unit arithmetic operations Fp and Fm in the butterfly arithmetic operation illustrated in paragraphs describing the arithmetic operation unit 100 illustrated in FIG. 1, and input data DI2 is the real number b1 in the Formula (3) and the Formula (4). Input data DI3 is the real number a3 in the Formula (3) and the Formula (4), and input data DI4 is the real number b3 in the Formula (3) and the Formula (4). Input data DI5 is the real number a2 in the Formula (3) and the Formula (4), and input data DI6 is the real number b2 in the Formula (3) and the Formula (4).

In the operation S210, the input selection unit 183 outputs input data DI3 received from the holding unit 203 to the multiplication unit 121, and the input selection unit 184 outputs input data DI4 received from the holding unit 204 to the multiplication unit 122.

In the operation S212, the multiplication unit 121 calculates arithmetic data DA1, and the multiplication unit 122 calculates arithmetic data DA2. For example, the multiplication unit 121 multiplies input data DI3 (=a3) received from the input selection unit 183 and input data DI5 (=a2) received from the holding unit 205 to calculate arithmetic data DA1 (=a2×a3). Also, the multiplication unit 122 multiplies input data DI4 (=b3) received from the input selection unit 184 and input data DI6 (=b2) received from the holding unit 206 to calculate arithmetic data DA2 (=b2×b3).

In the operation S214, the addition unit 141 subtracts arithmetic data DA2 (=b2×b3) from arithmetic data DA1 (=a2×a3) to calculate arithmetic data DA3 (=a2×a3−b2×b3).

In the operation S216, the input selection unit 181 outputs input data DI1 received from the holding unit 201 to the addition unit 142, and the arithmetic selection unit 161 outputs arithmetic data DA3 received from the addition unit 141 to the addition unit 142. The input selection unit 182 outputs input data DI1 received from the holding unit 201 to the addition unit 143, and the arithmetic selection unit 162 outputs arithmetic data DA3 received from the addition unit 141 to the addition unit 143. This allows addition units 142 and 143 to share a pair of data (input data DI1 and arithmetic data DA3).

In the operation S218, the addition unit 142 calculates arithmetic result data DR1, and the addition unit 143 calculates arithmetic result data DR2. For example, the addition unit 142 adds input data DI1 (=a1) received from the input selection unit 181 and arithmetic data DA3 (=a2×a3−b2×b3) received from arithmetic selection unit 161 to calculate arithmetic result data DR1 (=a1+(a2×a3−b2×b3)). This operation calculates a real part (=a1+(a2×a3−b2×b3)) of the Fp out of the pair of unit arithmetic operations Fp and Fm.

The addition unit 143 subtracts arithmetic data DA3 (=a2×a3−b2×b3) received from the arithmetic selection unit 162 from input data DI1 (=a1) received from the input selection unit 182 to calculate arithmetic result data DR2 (=a1−(a2×a3−b2×b3)). This operation calculates a real part (=a1−(a2×a3−b2×b3)) of the Fm out of the pair of unit arithmetic operations Fp and Fm.

The addition unit 142 outputs arithmetic result data DR1 to the holding unit 231, and the addition unit 143 outputs arithmetic result data DR2 to the holding unit 232. Thus, the holding unit 231 holds arithmetic result data DR1 (real part of the Fp), and the holding unit 232 holds arithmetic result data DR2 (real part of the Fm). Arithmetic result data DR1 and DR2, that holding units 231 and 232 hold, are transferred to, for example, an external register file of the arithmetic operation unit 100B before being subjected to the processing of the operation S228.

In the operation S220, the input selection unit 183 outputs input data DI4 received from the holding unit 204 to the multiplication unit 121, and the input selection unit 184 outputs input data DI3 received from the holding unit 203 to the multiplication unit 122. Thus, the input selection unit 183 alternately outputs input data DI3 received from the holding unit 203 and input data DI4 received from the holding unit 204 to the multiplication unit 121 in the first and second arithmetic operations. Then, the input selection unit 184 outputs input data DI different from input data DI that the input selection unit 183 outputs to the multiplication unit 121 out of input data DI3 received from the holding unit 203 and input data DI4 received from the holding unit 204 to the multiplication unit 122.

In the operation S222, the multiplication unit 121 calculates arithmetic data DA1, and the multiplication unit 122 calculates arithmetic data DA2. For example, the multiplication unit 121 multiplies input data DI4 (=b3) received from the input selection unit 183 and input data DI5 (=a2) received from the holding unit 205 to calculate arithmetic data DA1 (=a2×b3). Also, the multiplication unit 122 multiplies input data DI3 (=a3) received from the input selection unit 184 and input data DI6 (=b2) received from the holding unit 206 to calculate arithmetic data DA2 (=a3×b2).

In the operation S224, the addition unit 141 adds arithmetic data DA1 (=a2×b3) and arithmetic data DA2 (=a3×b2) to calculate arithmetic data DA3 (=a2×b3+a3×b2). Although the addition unit 141 subtracts arithmetic data DA2 from arithmetic data DA1 in the operation S214, the addition unit 141 adds arithmetic data DA1 and arithmetic data DA2 in the operation S224.

In the operation S226, the input selection unit 181 outputs input data DI2 received from the holding unit 202 to the addition unit 142, and the arithmetic selection unit 161 outputs arithmetic data DA3 received from the addition unit 141 to the addition unit 142. The input selection unit 182 outputs input data DI2 received from the holding unit 202 to the addition unit 143, and the arithmetic selection unit 162 outputs arithmetic data DA3 received from the addition unit 141 to the addition unit 143. This allows addition units 142 and 143 to share a pair of data (input data DI2 and arithmetic data DA3).

Thus, the input selection unit 181 alternately outputs input data DI1 received from the holding unit 201 and input data received from the holding unit 202 to the addition unit 142 in the first and second arithmetic operations. Then, the input selection unit 182 outputs input data DI identical with input data DI that the input selection unit 181 outputs to the addition unit 142 out of input data DI1 received from the holding unit 201 and input data DI2 received from the holding unit 202 to the addition unit 143.

In the operation S228, the addition unit 142 calculates arithmetic result data DR1, and the addition unit 143 calculates arithmetic result data DR2. For example, the addition unit 142 adds input data DI2 (=b1) received from the input selection unit 181 and arithmetic data DA3 (=a2×b3+a3×b2) received from arithmetic selection unit 161 to calculate arithmetic result data DR1 (=b1+(a2×b3+a3×b2)). This operation calculates a imaginary part (=b1+(a2×b3+−a3×b2)) of the Fp out of the pair of unit arithmetic operations Fp and Fm.

The addition unit 143 subtracts arithmetic data DA3 (=a2×b3+a3×b2) received from the arithmetic selection unit 162 from input data DI2 (=a2) received from the input selection unit 182 to calculate arithmetic result data DR2 (=b1−(a2×b3+a3×b2)). This operation calculates a imaginary part (=b1−(a2×b3+a3×b2)) of the Fm out of the pair of unit arithmetic operations Fp and Fm.

The addition unit 142 outputs arithmetic result data DR1 to the holding unit 231, and the addition unit 143 outputs arithmetic result data DR2 to the holding unit 232. Thus, the holding unit 231 holds arithmetic result data DR1 (imaginary part of the Fp), and the holding unit 232 holds arithmetic result data DR2 (imaginary part of the Fm).

Thus, in a series of processings from the operation S200 to the operation S218, real parts of the pair of unit arithmetic operations Fp and Fm are calculated, and in a series of processings from the operation S220 to the operation S228, imaginary parts of the pair of unit arithmetic operations Fp and Fm are calculated. More specifically, the arithmetic operation unit 100B may implement the butterfly arithmetic operation by performing an arithmetic operation using multiplication units 121 and 122 and addition units 141, 142, and 143 twice without replacing input data DI that holding units 201 to 206 hold, in first and second arithmetic operations. Thus, the arithmetic operation unit 100B may implement the butterfly arithmetic operation in an efficient manner. When implementing an arithmetic operation other than the butterfly arithmetic operation (operation S100: No), the arithmetic operation unit 100B implements a series of processings from the operation S300 to the operation S318.

In the operation S300, holding units 201 to 206 hold input data DI1 to DI6 of two arithmetic operations (for example, two product-sum operations) respectively. For example, input data DI1 is the real number d1; input data DI3 is the real number d3; input data DI5 is the real number d2; input data DI2 is the real number e1; input data DI4 is the real number e3; and input data DI6 is the real number e2.

In the operation S310, the input selection unit 183 outputs input data DI3 received from the holding unit 203 to the multiplication unit 121, and the input selection unit 184 outputs input data DI4 received from the holding unit 204 to the multiplication unit 122.

In the operation S312, the multiplication unit 121 calculates arithmetic data DA1, and the multiplication unit 122 calculates arithmetic data DA2. For example, the multiplication unit 121 multiplies input data DI3 (=d3) received from the input selection unit 183 and input data DI5 (=d2) received from the holding unit 205 to calculate arithmetic data DA1 (=d2×d3). Also, the multiplication unit 122 multiplies input data DI4 (=e3) received from the input selection unit 184 and input data DI6 (=e2) received from the holding unit 206 to calculate arithmetic data DA2 (=e2×e3).

In FIG. 5, when an arithmetic operation other than the butterfly arithmetic operation is implemented, arithmetic data DA3 is not used and therefore the processing of calculating arithmetic data DA3 is saved. Consequently, after implementing the processing of the operation S312, the arithmetic operation unit 100B implements processing of the operation S316. Even in an arithmetic operation other than the butterfly arithmetic operation, the arithmetic operation unit 100B may implement the processing of adding arithmetic data DA1 and DA2 to calculate arithmetic data DA3.

In the operation S316, the input selection unit 181 outputs input data DI1 received from the holding unit 201 to the addition unit 142, and the arithmetic selection unit 161 outputs arithmetic data DA1 received from the multiplication unit 121 to the addition unit 142. The input selection unit 182 outputs input data DI2 received from the holding unit 202 to the addition unit 143, and the arithmetic selection unit 162 outputs arithmetic data DA2 received from the multiplication unit 122 to the addition unit 143. Thus, the addition unit 142 receives input data DI1 and arithmetic data DA1, and the addition unit 143 receives input data DI2 and arithmetic data DA2.

In the operation S318, the addition unit 142 calculates arithmetic result data DR1, and the addition unit 143 calculates arithmetic result data DR2. For example, the addition unit 142 adds input data DI1 (=d1) received from the input selection unit 181 and arithmetic data DA1 (=d2×d3) received from arithmetic selection unit 161 to calculate arithmetic result data DR1 (=d1+d2×d3). Thus, the result (=d1+d2×d3) of one of two product-sum operations may be obtained.

The addition unit 143 adds input data DI2 (=e1) received from the input selection unit 182 and arithmetic data DA1 (=e2×e3) received from arithmetic selection unit 162 to calculate arithmetic result data DR2 (=e1+e2×e3). Thus, the result (=e1+e2×e3) of the other one of two product-sum operations may be obtained.

The addition unit 142 outputs arithmetic result data DR1 to the holding unit 231, and the addition unit 143 outputs arithmetic result data DR2 to the holding unit 232. Thus, the holding unit 231 holds arithmetic result data DR1, and the holding unit 232 holds arithmetic result data DR2. Thus, the arithmetic operation unit 100B may implement two product-sum operations in parallel and implement an arithmetic operation other than the butterfly arithmetic operation in an efficient manner.

In an arithmetic operation other than the butterfly arithmetic operation, the arithmetic operation unit 100B may set either one of input data DI3 and DI5 to "1", and thereby implement addition of the other one of input data DI3 and DI5 and input data DI1. In the same manner, the arithmetic operation unit 100B may set either one of input data DI4 and DI6 to "1", and thereby implement addition of the other one of input data DI4 and DI6 and input data DI2. Also, the arithmetic operation unit 100B may implement multiplication of input data DI3 and DI5 by setting input data DI1 to "0", and implement multiplication of input data DI4 and DI6 by setting input data DI2 to "0".

Operations of the arithmetic operation unit 100B are not limited to the example illustrated in FIG. 5. For example, the arithmetic operation unit 100B may calculate the imaginary part of the pair of unit arithmetic operations Fp and Fm prior to the real part of the pair of unit arithmetic operations Fp and Fm. More specifically, implementation order of a series of processings from the operation S210 to the operation S218 and a series of processings from the operation S220 to the operation S228 may be reverse to the example illustrated in FIG. 5.

As above, similar effects as in the embodiments illustrated in FIGS. 1 to 3 also may be obtained in FIGS. 4 and 5. For example, addition units 142 and 143 receive arithmetic data DA corresponding to the content of the arithmetic operation implemented by the arithmetic operation unit 100B respectively from arithmetic selection units 161 and 162. This enables to suppress drop of the arithmetic efficiency in implementing an arithmetic operation other than the butterfly arithmetic operation, and improve arithmetic efficiency in implementing the butterfly arithmetic operation. As a result, arithmetic efficiency of the arithmetic operation unit 100B may be improved.

Input selection units 181, 182, 183, and 184 change over data to be outputted to next stages (for example, addition units 142 and 143, and multiplication units 121 and 122) between the arithmetic operation of calculating the real part of the pair of unit arithmetic operations Fp and Fm and the arithmetic operation of calculating the imaginary part in the butterfly arithmetic operation. This enables to calculate the real part and the imaginary part of the pair of unit arithmetic operations Fp and Fm in the butterfly arithmetic operation without replacing input data DI that holding units 201 to 206 hold, in first and second arithmetic operations, and thereby implement the butterfly arithmetic operation in an efficient manner.

Figure 6:
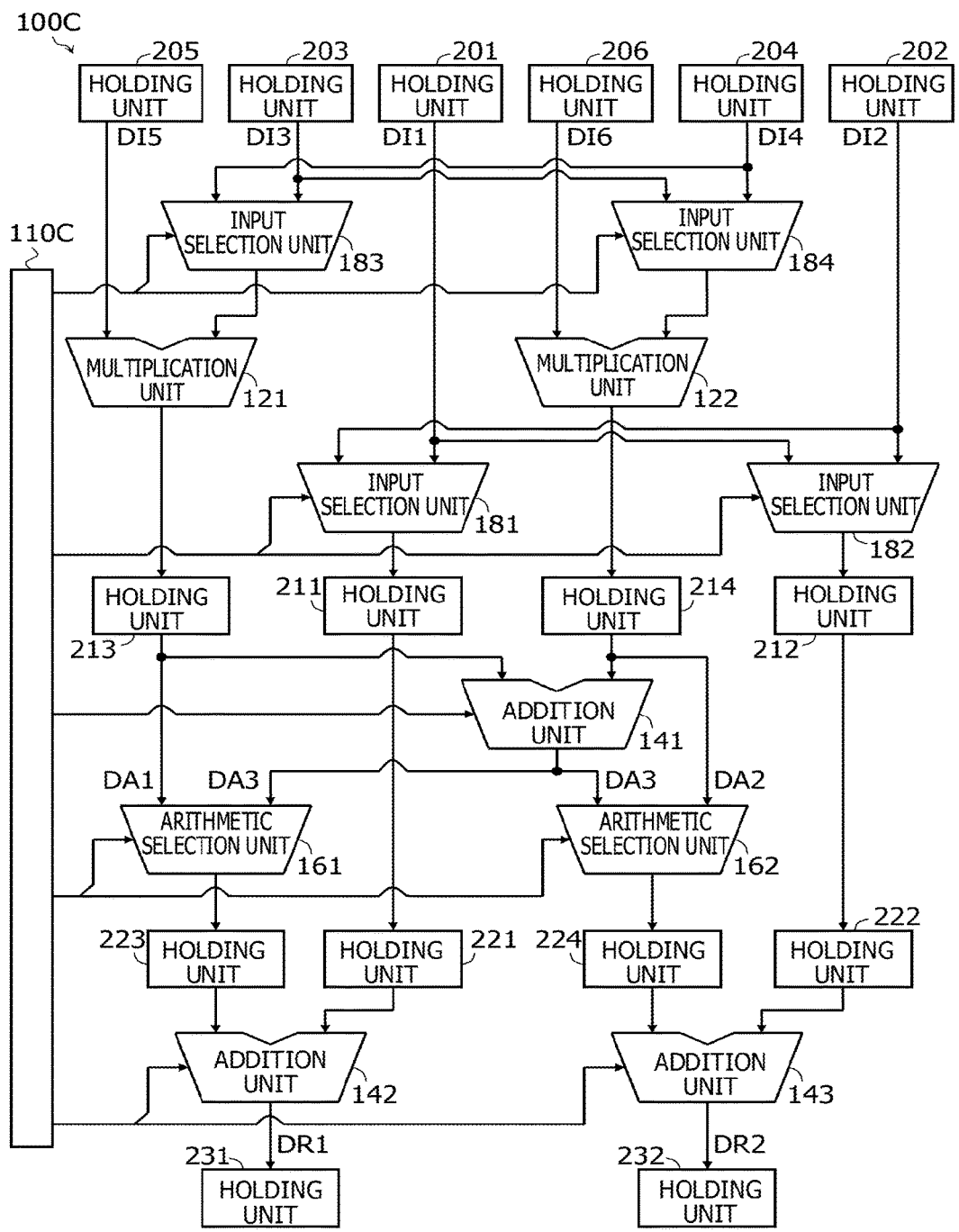
FIG. 6 illustrates another embodiment of an arithmetic operation unit and a method of controlling the arithmetic operation unit.

FIG. 6 illustrates an example of an arithmetic operation unit and a method of controlling the arithmetic operation unit. Elements identical or similar with elements described with reference to FIGS. 1 to 5 are assigned with identical or similar reference numerals, and detailed description thereof is omitted. An arithmetic operation unit 100C illustrated in FIG. 6 is configured to implement arithmetic operation using a plurality of input data DI (DI1, DI2, DI3, DI4, DI5, DI6) separately in a plurality of stages. More specifically, the arithmetic operation unit 100C adopts the pipeline processing scheme. Although not illustrated in FIG. 6, the arithmetic operation unit 100C is included in the arithmetic processing device 10 that is a processor such as, for example, a CPU, in the same manner as the arithmetic operation unit 100 illustrated in FIG. 1.

The arithmetic operation unit 100C is identical or similar with the arithmetic operation unit 100B illustrated in FIG. 4 except that the arithmetic operation unit 100C adopts the pipeline processing scheme. For example, the arithmetic operation unit 100C includes a controller 110C in place of the controller 110b illustrated in FIG. 4, and holding units 211, 212, 213, 214, 221, 222, 223, and 224 are added to the arithmetic operation unit 100B illustrated in FIG. 4. Other configuration of the arithmetic operation unit 100C is identical or similar with the arithmetic operation unit 100B illustrated in FIG. 4.

The arithmetic operation unit 100C includes the controller 110C, multiplication units 121 and 122, addition units 141, 142, and 143, arithmetic selection units 161 and 162, input selection units 181, 182, 183, and 184, and holding units 201 to 206, 211 to 214, 221 to 224, and 231 to 232. Arithmetic operations that the arithmetic operation unit 100C implements are divided into three stages by holding units 211 to 214 and 221 to 224.

The controller 110C is identical or similar with the controller 110б illustrated in FIG. 4 except that the controller 110C implements control of the pipeline processing. More specifically, the controller 110C implements control of the pipeline processing and controls operations of addition units 141, 142, and 143, arithmetic selection units 161 and 162, and input selection units 181, 182, 183, and 184 based on the content of the arithmetic operation that the arithmetic operation unit 100C implements.

The holding unit 211 holds input data DI selected by the input selection unit 181, out of input data DI1 and DI2. Input data DI that the holding unit 211 holds is transferred to the holding unit 221. The holding unit 212 holds input data DI selected by the input selection unit 182, out of input data DI1 and DI2. Input data DI that the holding unit 212 holds is transferred to the holding unit 222.

The holding unit 213 holds arithmetic data DA1 that is a multiplication result of the multiplication unit 121. Arithmetic data DA1 that the holding unit 213 holds is transferred to the addition unit 141 and the arithmetic selection unit 161. The holding unit 214 holds arithmetic data DA2 that is a multiplication result of the multiplication unit 122. Arithmetic data DA2 that the holding unit 214 holds is transferred to the addition unit 141 and the arithmetic selection unit 162.

The holding unit 221 holds input data DI received from the holding unit 211. Input data DI that the holding unit 221 holds is transferred to the addition unit 142. The holding unit 222 holds input data DI received from the holding unit 212. Input data DI that the holding unit 222 holds is transferred to the addition unit 143.

The holding unit 223 holds arithmetic data DA that the arithmetic selection unit 161, out of arithmetic data DA1 and DA3. Arithmetic data DA selected by the holding unit 223 holds is transferred to the addition unit 142. The holding unit 224 holds arithmetic data DA selected by the arithmetic selection unit 162, out of arithmetic data DA2 and DA3. Arithmetic data DA that the holding unit 224 holds is transferred to the addition unit 143.

Configuration of the arithmetic operation unit 100C is not limited to the example illustrated in FIG. 6. For example, holding units 211 to 214 may be saved from the arithmetic operation unit 100C, or holding units 221 to 224 may be saved from the arithmetic operation unit 100C. In this case, arithmetic operations that the arithmetic operation unit 100C implements are divided into two stages. Alternatively, arithmetic operations that the arithmetic operation unit 100C implements may be divided into four or more stages.

Figure 7:
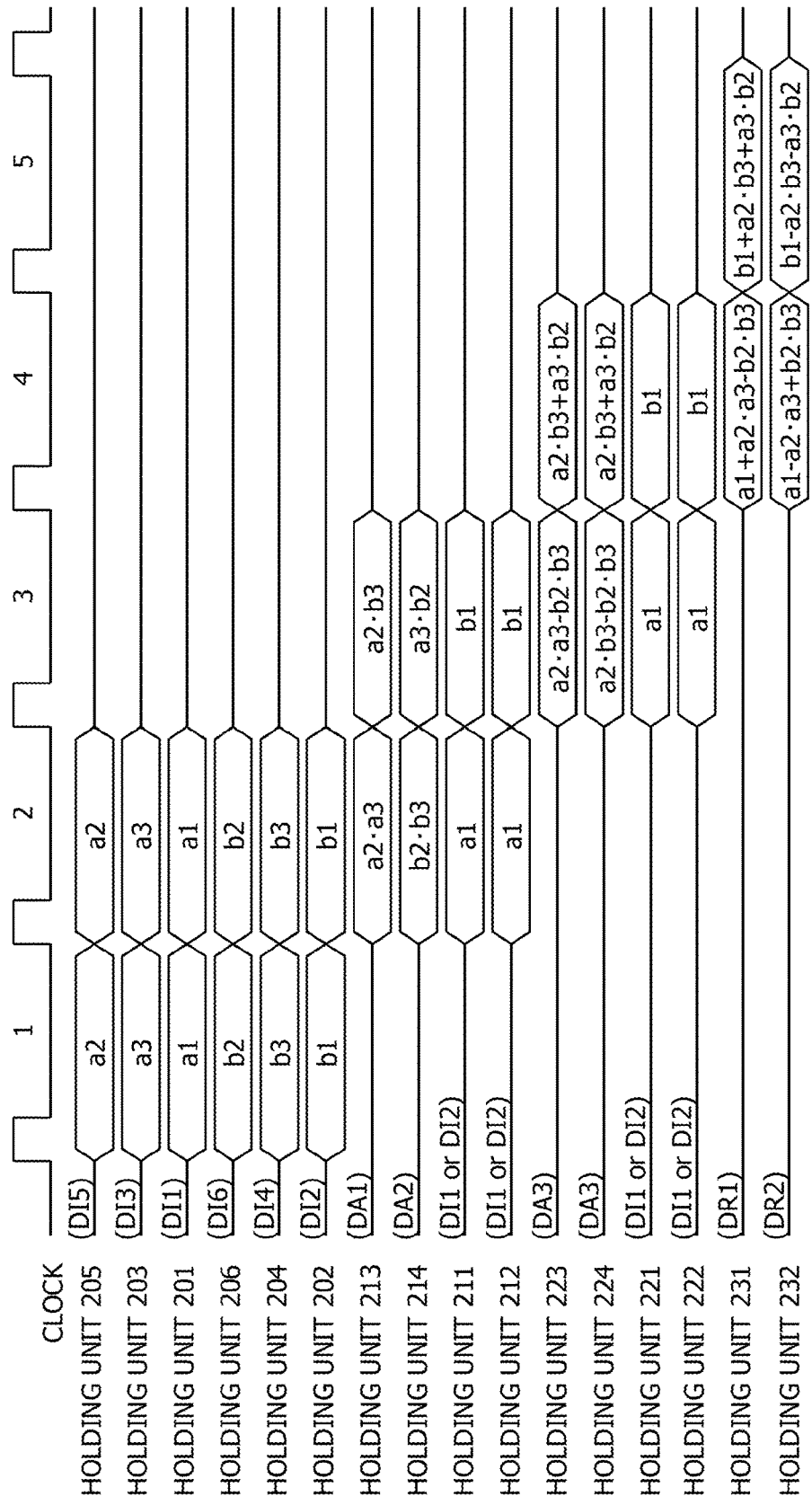
FIG. 7 illustrates an example of operations of the arithmetic operation unit illustrated in FIG. 6.

FIG. 7 illustrates an example of operations of the arithmetic operation unit illustrated in FIG. 6. Operations illustrated in FIG. 7 are an aspect of the method of controlling the arithmetic operation unit. FIG. 7 illustrates an example of operations of the arithmetic operation unit 100C when one butterfly arithmetic operation is implemented separately twice. Meaning of a1, a2, a3, b1, b2, and b3 illustrated in FIG. 7 is the same as a1, a2, a3, b1, b2, and b3 illustrated in FIG. 5. More specifically, real numbers a1, a2, a3, b1, b2, and b3 are real numbers a1, a2, a3, b1, b2, and b3 in the Formula (3) and the Formula (4) for the pair of unit arithmetic operations Fp and Fm in the butterfly arithmetic operation illustrated in paragraphs describing the arithmetic operation unit 100 illustrated in FIG. 1. A clock illustrated in FIG. 7 is an operating clock of the pipeline processing.

In the first cycle, the holding unit 205 holds input data DI5 of the real number a2; the holding unit 203 holds input data DI3 of the real number a3; and the holding unit 201 holds input data DI1 of the real number a1. The holding unit 206 holds input data DI6 of the real number b2; the holding unit 204 holds input data DI4 of the real number b3; and the holding unit 202 holds input data DI2 of the real number b1.

Thus, the multiplication unit 121 receives input data DI3 (=a3) that the holding unit 203 holds via the input selection unit 183, and receives input data DI5 (=a2) that the holding unit 205 holds. Also, the multiplication unit 122 receives input data DI4 (=b3) that the holding unit 204 holds via the input selection unit 184, and receives input data DI6 (=b2) that the holding unit 206 holds. Then, the multiplication unit 121 multiplies input data DI3 and DI5 to calculate arithmetic data DA1 (=a2×a3), and the multiplication unit 122 multiplies input data DI4 and DI6 to calculate arithmetic data DA2 (=b2×b3).

In the second cycle, holding units 201 to 206 continuously hold input data DI that the holding units hold in the first cycle. The holding unit 213 holds arithmetic data DA1 (=a2×a3) that is a multiplication result of input data DI3 and DI5, and the holding unit 214 holds arithmetic data DA2 (=b2×b3) that is a multiplication result of input data DI4 and DI6. The holding unit 211 holds input data DI1 (=a1) received from the holding unit 201 via the input selection unit 181, and the holding unit 212 holds input data DI1 (=a1) received from the holding unit 201 via the input selection unit 182.

The multiplication unit 121 receives input data DI4 (=b3) that the holding unit 204 holds via the input selection unit 183, and receives input data DI5 (=a2) that the holding unit 205 holds. The multiplication unit 122 receives input data DI3 (=a3) that the holding unit 203 holds via the input selection unit 184, and receives input data DI6 (=b2) that the holding unit 206 holds. Then, the multiplication unit 121 multiplies input data DI4 and DI5 to calculate arithmetic data DA1 (=a2×b3), and the multiplication unit 122 multiplies input data DI3 and DI6 to calculate arithmetic data DA2 (=a3×b2).

The addition unit 141 subtracts arithmetic data DA2 (=b2×b3) that the holding unit 214 holds from arithmetic data DA1 (=a2×a3) that the holding unit 213 holds to calculate arithmetic data DA3 (=a2×a3−b2×b3).

In the third cycle, the holding unit 213 holds arithmetic data DA1 (=a2×b3) that is a multiplication result of input data DI4 and DI5, and the holding unit 214 holds arithmetic data DA2 (=a3×b2) that is a multiplication result of input data DI3 and DI6. The holding unit 211 holds input data DI2 (=b1) received from the holding unit 202 via the input selection unit 181, and the holding unit 212 holds input data DI2 (=b1) received from the holding unit 202 via the input selection unit 182.

Holding units 223 and 224 hold arithmetic data DA3 (=a2×a3−b2×b3) that is a result of the subtraction of arithmetic data DA2 from arithmetic data DA1. More specifically, the holding unit 223 holds arithmetic data DA3 out of arithmetic data DA1 and DA3, and the holding unit 224 holds arithmetic data DA3 out of arithmetic data DA2 and DA3. The holding unit 221 holds input data DI1 (=a1) received from the holding unit 211, and the holding unit 222 holds input data DI1 (=a1) received from the holding unit 212.

The addition unit 141 adds arithmetic data DA1 (=a2×b3) that the holding unit 213 holds and arithmetic data DA2

(=a3×b2) that the holding unit 214 holds to calculate arithmetic data DA3 (=a2×b3+a3×b2).

The addition unit 142 adds input data DI1 (=a1) that the holding unit 221 holds and arithmetic data DA3 (=a2×a3−b2×b3) that the holding unit 223 holds to calculate arithmetic result data DR1 (=a1+a2×a3−b2×b3). The addition unit 143 subtracts arithmetic data DA3 (=a2×a3−b2×b3) that the holding unit 224 holds from input data DI1 (=a1) that the holding unit 222 holds to calculate arithmetic result data DR2 (=a1−a2×a3+b2×b3).

In the fourth cycle, holding units 223 and 224 hold arithmetic data DA3 (=a2×b3+a3×b2) that is a result of the addition of arithmetic data DA1 and DA2. More specifically, the holding unit 223 holds arithmetic data DA3 out of arithmetic data DA1 and DA3, and the holding unit 224 holds arithmetic data DA3 out of arithmetic data DA2 and DA3. The holding unit 221 holds input data DI2 (=b1) received from the holding unit 211, and the holding unit 222 holds input data DI2 (=b1) received from the holding unit 212.

The holding unit 231 holds arithmetic result data DR1 (=a1+a2×a3−b2×b3) that is a result of the addition of input data DI1 and arithmetic data DA3. The holding unit 232 holds arithmetic result data DR2 (=a1−a2×a3+b2 b3) that is a result of the subtraction of arithmetic data DA3 from input data DI1. Thus, the real part of each of the pair of unit arithmetic operations Fp and Fm is held by holding units 231 and 232.

The addition unit 142 adds input data DI2 (=b1) that the holding unit 221 holds and arithmetic data DA3 (=a2×b3+a3×b2) that the holding unit 223 holds to calculate arithmetic result data DR1 (=b1+a2×b3+a3×b2). The addition unit 143 subtracts arithmetic data DA3 (=a2×b3+a3×b2) that the holding unit 224 holds from input data DI2 (=b1) that the holding unit 222 holds to calculate arithmetic result data DR2 (=b1−a2×b3−a3×b2).

In the fifth cycle, the holding unit 231 holds arithmetic result data DR1 (=b1+a2×b3+a3×b2) that is a result of the addition of input data DI2 and arithmetic data DA3. The holding unit 232 holds arithmetic result data DR2 (=b1−a2×b3−a3×b2) that is a result of the subtraction of arithmetic data DA3 from input data DI2. Thus, the imaginary part of each of the pair of unit arithmetic operations Fp and Fm is held by holding units 231 and 232 respectively. Arithmetic result data DR1 and DR2, which holding units 231 and 232 hold, are transferred to, for example, a register file outside the arithmetic operation unit 100C.

Thus, the arithmetic operation unit 100C may implement the butterfly arithmetic operation in the latency of four cycles. Also, the arithmetic operation unit 100C may continuously implement the butterfly arithmetic operation in the pitch of two cycles. Operation of the arithmetic operation unit 100C when one butterfly arithmetic operation is implemented twice is not limited to the example illustrated in FIG. 7. Here, for example, in an arithmetic operation unit not including input selection units 181 to 184, input data DI that each of holding units 201 to 206 hold is updated in the second cycle to input data DI for calculating the imaginary part of each of the pair of unit arithmetic operations Fp and Fm respectively.

Figure 8:
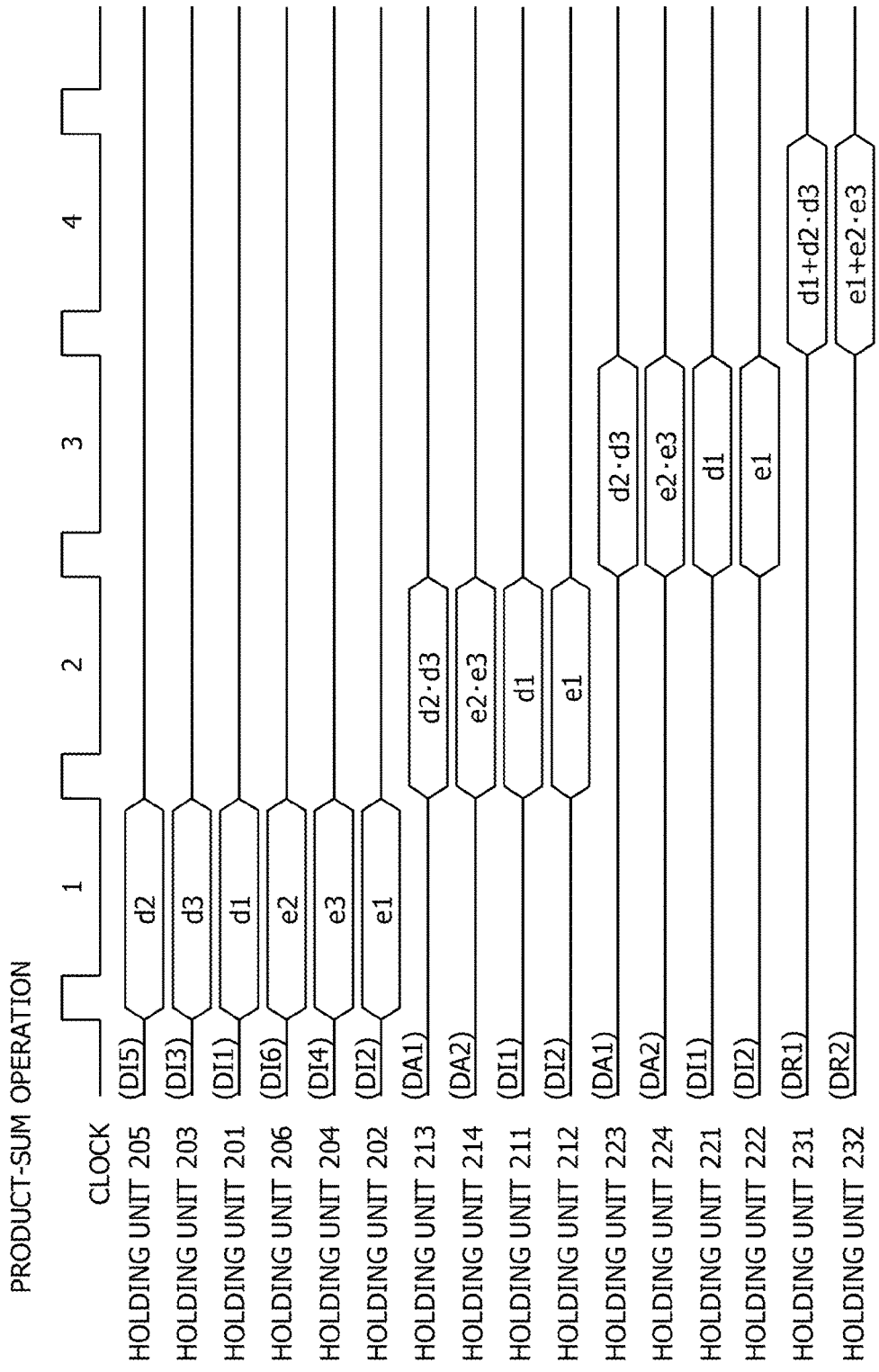
FIG. 8 illustrates an example of operations of the arithmetic operation unit illustrated in FIG. 6.

FIG. 8 illustrates another example of operations of the arithmetic operation unit 100C illustrated in FIG. 6. Operations illustrated in FIG. 8 are an aspect of the method of controlling the arithmetic operation unit. FIG. 8 illustrates an example of operations of the arithmetic operation unit 100C when two product-sum operations are implemented. Meaning of d1, d2, d3, e1, e2, and e3 illustrated in FIG. 8 is the same as d1, d2, d3, e1, e2, and e3 illustrated in FIG. 5. More specifically, real numbers d1, d2 and d3 are one input data DI out of two product-sum operations, and real numbers e1, e2, and e3 are the other input data DI out of two product-sum operations. A clock illustrated in FIG. 8 is an operating clock of the pipeline processing.

In the first cycle, the holding unit 205 holds input data DI5 of the real number d2; the holding unit 203 holds input data DI3 of the real number d3; and the holding unit 201 holds input data DI1 of the real number d1. The holding unit 206 holds input data DI6 of the real number e2; the holding unit 204 holds input data DI4 of the real number e3; and the holding unit 202 holds input data DI2 of the real number e1.

Thus, the multiplication unit 121 receives input data DI3 (=d3) that the holding unit 203 holds via the input selection unit 183, and receives input data DI5 (=d2) that the holding unit 205 holds. Also, the multiplication unit 122 receives input data DI4 (=e3) that the holding unit 204 holds via the input selection unit 184, and receives input data DI6 (=e2) that the holding unit 206 holds. Then, the multiplication unit 121 multiplies input data DI3 and DI5 to calculate arithmetic data DA1 (=d2×d3), and the multiplication unit 122 multiplies input data DI4 and DI6 to calculate arithmetic data DA2 (=e2×e3).

In the second cycle, the holding unit 213 holds arithmetic data DA1 (=d2×d3) that is a multiplication result of input data DI3 and DI5, and the holding unit 214 holds arithmetic data DA2 (=e2×e3) that is a multiplication result of input data DI4 and DI6. The holding unit 211 holds input data DI1 (=d1) received from the holding unit 201 via the input selection unit 181, and the holding unit 212 holds input data DI2 (=e1) received from the holding unit 202 via the input selection unit 182.

In the third cycle, the holding unit 223 holds arithmetic data DA1 (=d2×d3) received from the holding unit 213 via the arithmetic selection unit 161, and the holding unit 224 holds arithmetic data DA2 (=e2×e3) received from the holding unit 214 via the arithmetic selection unit 162. More specifically, the holding unit 223 holds arithmetic data DA1 out of arithmetic data DA1 and DA3, and the holding unit 224 holds arithmetic data DA2 out of arithmetic data DA2 and DA3. The holding unit 221 holds input data DI1 (=d1) received from the holding unit 211, and the holding unit 222 holds input data DI2 (=e1) received from the holding unit 212.

The addition unit 142 adds input data DI1 (=d1) that the holding unit 221 holds and arithmetic data DA1 (=d2×d3) that the holding unit 223 holds to calculate arithmetic result data DR1 (=d1+d2×d3). The addition unit 143 adds input data DI2 (=e1) that the holding unit 222 holds and arithmetic data DA2 (=e2×e3) that the holding unit 224 holds to calculate arithmetic result data DR2 (=e1+e2×e3).

In the fourth cycle, the holding unit 231 holds arithmetic result data DR1 (=d1+d2×d3) that is a result of the addition of input data DI1 and arithmetic data DA1. The holding unit 232 holds arithmetic result data DR2 (=e1+e2×e3) that is a result of the addition of input data DI2 and arithmetic data DA2. Thus, each result of two product-sum operations is held by holding units 231 and 232 respectively.

Thus, the arithmetic operation unit 100C may implement two product-sum operations in parallel. Operations of the arithmetic operation unit 100C when two product-sum operations are implemented twice are not limited to the example illustrated in FIG. 8.

Figure 9:
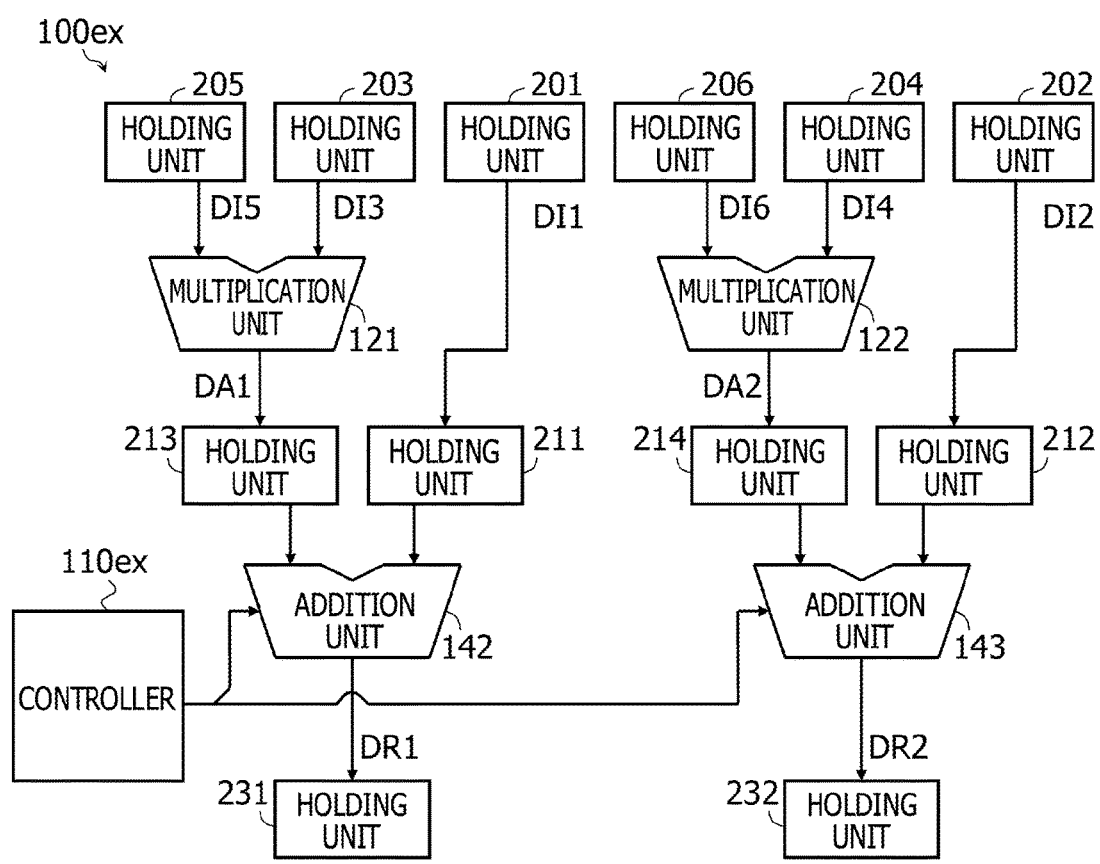
FIG. 9 illustrates an example of operations of the arithmetic operation unit illustrated in FIG. 6.

FIG. 9 illustrates an example of the arithmetic operation unit illustrated in FIG. 6. In an arithmetic operation unit 100ex of the comparative example, the addition unit 141, arithmetic selection units 161 and 162, input selection units 181 to 184, and holding units 221 to 224 are removed from the arithmetic operation unit 100C illustrated in FIG. 6. The arithmetic operation unit 100ex includes a controller 110ex in place of the controller 110C illustrated in FIG. 6. Other configuration of the arithmetic operation unit 100ex is identical or similar with the arithmetic operation unit 100C illustrated in FIG. 6.

The arithmetic operation unit 100ex includes the controller 110ex, multiplication units 121 and 122, addition units 142 and 143, and holding units 201 to 206, 211 to 214, and 231 to 232. A block including multiplication unit 121, addition unit 142, and holding units 201, 203, 205, 211, 213, and 231 operates as a product-sum operator that implements the product-sum operation. In the same manner, a block including the multiplication unit 122, the addition unit 143, and holding units 202, 204, 206, 212, 214, and 232 operates as a product-sum operator that implements the product-sum operation. For example, the arithmetic operation unit 100ex includes two product-sum operators.

Arithmetic operations that the arithmetic operation unit 100ex implements are divided into two stages by holding units 211 to 214. More specifically, the arithmetic operation unit 100ex is configured to implement arithmetic operation using a plurality of input data DI (DI1, DI2, DI3, DI4, DI5, DI6) separately in two stages. The controller 110ex implements control of the pipeline processing and controls operations of addition units 142 and 143. In the arithmetic operation unit 100ex, arithmetic efficiency in implementing the butterfly arithmetic operation drops compared with the arithmetic operation unit 100C as illustrated in FIG. 10.

Figure 10:
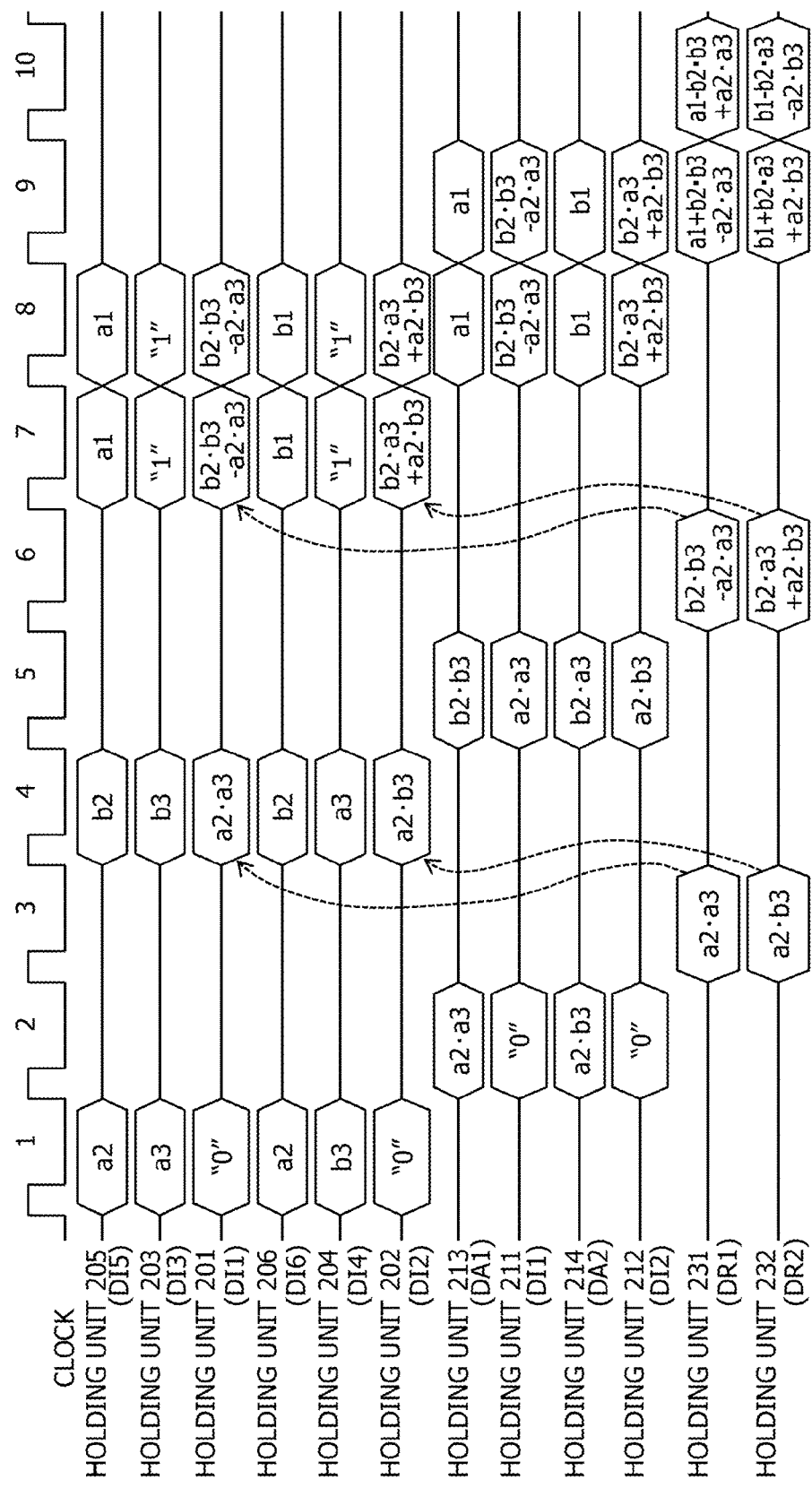
FIG. 10 illustrates an example of operations of the arithmetic operation unit illustrated in FIG. 9.

FIG. 10 illustrates an example of operations of the arithmetic operation unit 100 illustrated in FIG. 9. FIG. 10 illustrates an example of operations of the arithmetic operation unit 100ex when implementing the butterfly arithmetic operation. Meaning of a1, a2, a3, b1, b2, and b3 illustrated in FIG. 10 is the same as the meaning of a1, a2, a3, b1, b2, and b3 illustrated in FIG. 7. For example, real numbers a1, a2, a3, b1, b2, and b3 are real numbers a1, a2, a3, b1, b2, and b3 in the Formula (3) and the Formula (4) for the pair of unit arithmetic operations Fp and Fm in the butterfly arithmetic operation illustrated in paragraphs describing the arithmetic operation unit 100 illustrated in FIG. 1. A clock illustrated in FIG. 10 is an operating clock of the pipeline processing.

In the first cycle, the holding unit 205 holds input data DI5 of the real number a2; the holding unit 203 holds input data DI3 of the real number a3; and the holding unit 201 holds input data DI1 of the real number "0". The holding unit 206 holds input data DI6 of the real number a2; the holding unit 204 holds input data DI4 of the real number b3; and the holding unit 202 holds input data DI2 of the real number "0".

Thus, the multiplication unit 121 multiplies input data DI3 (=a3) that the holding unit 203 holds and input data DI5 (=a2) that the holding unit 205 holds to calculate arithmetic data DA1 (=a2×a3). The multiplication unit 122 multiplies input data DI4 (=b3) that the holding unit 204 holds and input data DI6 (=a2) that the holding unit 206 holds to calculate arithmetic data DA2 (=a2×b3).

In the second cycle, the holding unit 213 holds arithmetic data DA1 (=a2×a3) that is a multiplication result of input data DI3 and DI5, and the holding unit 214 holds arithmetic data DA2 (=a2×b3) that is a multiplication result of input data DI4 and DI6. The holding unit 211 holds input data DI1 (=0) received from the holding unit 201, and the holding unit 212 holds input data DI2 (=0) received from the holding unit 202.

The addition unit 142 adds input data DI1 (=0) that the holding unit 211 holds and arithmetic data DA1 (=a2×a3) that the holding unit 213 holds to calculate arithmetic result data DR1 (=a2×a3). The addition unit 143 adds input data DI2 (=0) that the holding unit 212 holds and arithmetic data DA2 (=a2×b3) that the holding unit 214 holds to calculate arithmetic result data DR2 (=a2×b3).

In the third cycle, the holding unit 231 holds arithmetic result data DR1 (=a2×a3) that is a result of the addition of input data DI1 and arithmetic data DA1. The holding unit 232 holds arithmetic result data DR2 (=a2×b3) that is a result of the addition of input data DI2 and arithmetic data DA2. Arithmetic result data DR1 and DR2 are fed back to holding units 201 and 202 as input data DI1 and DI2 of the next cycle (fourth cycle).

In the fourth cycle, the holding unit 205 holds input data DI5 of the real number b2; the holding unit 203 holds input data DI3 of the real number b3; and the holding unit 201 holds arithmetic result data DR1 (=a2×a3) received from the holding unit 231 as input data DI1. The holding unit 206 holds input data DI6 of the real number b2; the holding unit 204 holds input data DI4 of the real number a3; and the holding unit 202 holds arithmetic result data DR2 (=a2×b3) received from the holding unit 232 as input data DI2.

Thus, the multiplication unit 121 multiplies input data DI3 (=b3) that the holding unit 203 holds and input data DI5 (=b2) that the holding unit 205 holds to calculate arithmetic data DA1 (=b2×b3). The multiplication unit 122 multiplies input data DI4 (=a3) that the holding unit 204 holds and input data DI6 (=b2) that the holding unit 206 holds to calculate arithmetic data DA2 (=b2×a3).

In the fifth cycle, the holding unit 213 holds arithmetic data DA1 (=b2×b3) that is a multiplication result of input data DI3 and DI5, and the holding unit 214 holds arithmetic data DA2 (=b2×a3) that is a multiplication result of input data DI4 and DI6. The holding unit 211 holds input data DI1 (=a2×a3) received from the holding unit 201, and the holding unit 212 holds input data DI2 (=a2×b3) received from the holding unit 202.

The addition unit 142 subtracts input data DI1 (=a2×a3) that the holding unit 211 holds from arithmetic data DA1 (=b2×b3) that the holding unit 213 holds to calculate arithmetic result data DR1 (=b2×b3−a2×a3). The addition unit 143 adds arithmetic data DA2 (=b2×a3) that the holding unit 214 holds and input data DI2 (=a2×b3) that the holding unit 212 holds to calculate arithmetic result data DR2 (=b2×a3+a2×b3).

In the sixth cycle, the holding unit 231 holds arithmetic result data DR1 (=b2×b3−a2×a3) that is a result of the subtraction of input data DI1 from arithmetic data DA1. The holding unit 232 holds arithmetic result data DR2 (=b2×a3+a2×b3) that is a result of the addition of arithmetic data DA2 and input data DI2. Arithmetic result data DR1 and DR2 are fed back to holding units 201 and 202 as input data DI1 and DI2 of the next cycle (seventh cycle).

In the seventh cycle, the holding unit 205 holds input data DI5 of the real number a1, and the holding unit 203 holds input data DI3 of the real number "1". Then, the holding unit 201 holds arithmetic result data DR1 (=b2×b3−a2×a3) received from the holding unit 231 as input data DI1. The holding unit 206 holds input data DI6 of the real number b1; the holding unit 204 holds input data DI4 of the real number "1"; and the holding unit 202 holds arithmetic result data DR2 (=b2×a3+a2×b3) received from the holding unit 232 as input data DI2.

Thus, the multiplication unit 121 multiplies input data DI3 (=1) that the holding unit 203 holds and input data DI5

(=a1) that the holding unit 205 holds to calculate arithmetic data DA1 (=a1). The multiplication unit 122 multiplies input data DI4 (=1) that the holding unit 204 holds and input data DI6 (=b1) that the holding unit 206 holds to calculate arithmetic data DA2 (=b1).

In the eighth cycle, holding units 201 to 206 continuously hold input data DI that the holding units hold in the first cycle. The holding unit 213 holds arithmetic data DA1 (=a1) that is a multiplication result of input data DI3 and DI5, and the holding unit 214 holds arithmetic data DA2 (=b1) that is a multiplication result of input data DI4 and DI6. The holding unit 211 holds input data DI1 (=b2×b3−a2×a3) received from the holding unit 201, and the holding unit 212 holds input data DI2 (=b2×a3+a2×b3) received from the holding unit 202.

The addition unit 142 adds arithmetic data DA1 (=a1) that the holding unit 213 holds and input data DI1 (=b2×b3−a2×a3) that the holding unit 211 holds to calculate arithmetic result data DR1 (=a1+b2×b3−a2×a3). The addition unit 143 adds arithmetic data DA2 (=b1) that the holding unit 214 holds and input data DI2 (=b2×a3+a2×b3) that the holding unit 212 holds to calculate arithmetic result data DR2 (=b1+b2×a3+a2×b3).

In the ninth cycle, the holding unit 213 holds arithmetic data DA1 (=a1) that is a multiplication result of input data DI3 and DI5, and the holding unit 214 holds arithmetic data DA2 (=b1) that is a multiplication result of input data DI4 and DI6. The holding unit 211 holds input data DI1 (=b2×b3−a2×a3) received from the holding unit 201, and the holding unit 212 holds input data DI2 (=b2×a3+a2×b3) received from the holding unit 202.

The holding unit 231 holds arithmetic result data DR1 (=a1+b2×b3−a2×a3) that is a result of the addition of arithmetic data DA1 and input data DI1. The holding unit 232 holds arithmetic result data DR2 (=b1+b2×a3+a2×b3) that is a result of the addition of arithmetic data DA2 and input data DI2. Thus, the real part of Fm out of the pair of unit arithmetic operations Fp and Fm is held in the holding unit 231, and the imaginary part of Fp out of the pair of unit arithmetic operations Fp and Fm is held in the holding unit 232.

The addition unit 142 subtracts input data DI1 (=b2×b3−a2×a3) that the holding unit 211 holds from arithmetic data DA1 (=a1) that the holding unit 213 holds to calculate arithmetic result data DR1 (=a1−b2×b3+a2×a3). The addition unit 143 subtracts input data DI2 (=b2×a3+a2×b3) that the holding unit 212 holds from arithmetic data DA2 (=b1) that the holding unit 214 holds to calculate arithmetic result data DR2 (=b1−b2×a3−a2×b3).

In the tenth cycle, the holding unit 231 holds arithmetic result data DR1 (=a1−b2×b3+a2×a3) that is a result of the subtraction of input data DI1 from arithmetic data DA1. The holding unit 232 holds arithmetic result data DR2 (=b1−b2×a3−a2×b3) that is a result of the subtraction of input data DI2 from arithmetic data DA2. Thus, the real part of the Fp out of the pair of unit arithmetic operations Fp and Fm is held in the holding unit 231, and the imaginary part of the Fm out of the pair of unit arithmetic operations Fp and Fm is held in the holding unit 232. Arithmetic result data DR1 and DR2, which holding units 231 and 232 hold in the ninth cycle, are transferred to, for example, a register file outside the arithmetic operation unit 100C.

Thus, the arithmetic operation unit 100ex implements the butterfly arithmetic operation in a latency about two times (9 cycles) the latency (4 cycles) of the arithmetic operation unit 100C. A cycle pitch when the arithmetic operation unit 100ex continuously implements the butterfly arithmetic operation is four times (8 cycles) the cycle pitch (2 cycles) when the arithmetic operation unit 100ex continuously implements the butterfly arithmetic operation. More specifically, compared with the arithmetic operation unit 100ex, the arithmetic operation unit 100C may reduce the latency of the butterfly arithmetic operation by about a half, and further, reduce the cycle pitch in continuous implementation of the butterfly arithmetic operation by about a quarter. Thus, the arithmetic operation unit 100C improves throughput of the butterfly arithmetic operation compared with the arithmetic operation unit 100ex.

For example, in the arithmetic operation unit 100ex of the comparative example, input data DI that holding units 201 to 206 hold respectively is updated in two divided operations in one butterfly arithmetic operation. In updating input data DI that holding units 203 to 206 held respectively, a processing such as, for example, reading input data DI from a register file is implemented. As the frequency of implementing the processing of reading input data DI from the register file increases, power consumption also increases.

Meanwhile, the arithmetic operation unit 100C implements one butterfly arithmetic operation without updating input data DI that holding units 201 to 206 hold respectively as illustrated in FIG. 7. This enables the arithmetic operation unit 100C to reduce consumption power when implementing the butterfly arithmetic operation, compared with the arithmetic operation unit 100ex.

In FIGS. 6 and 8, similar effects as in the embodiments illustrated in FIGS. 1 to 5 may be also obtained. For example, addition units 142 and 143 receive arithmetic data DA corresponding to the content of the arithmetic operation implemented by the arithmetic operation unit 100C respectively from arithmetic selection units 161 and 162. This enables to suppress drop of the arithmetic efficiency in implementing an arithmetic operation other than the butterfly arithmetic operation, and improve the arithmetic efficiency in implementing the butterfly arithmetic operation. As a result, the arithmetic efficiency of the arithmetic operation unit 100C may be improved.

Input selection units 181, 182, 183, and 184 change over data to be outputted to next stages (for example, addition units 142 and 143, and multiplication units 121 and 122) in the arithmetic operation of calculating the real part of the pair of unit arithmetic operations Fp and Fm and the arithmetic operation of calculating the imaginary part in the butterfly arithmetic operation. This enables to calculate the real part and the imaginary part of the pair of unit arithmetic operations Fp and Fm in the butterfly arithmetic operation without replacing input data DI that holding units 201 to 206 hold, between first and second arithmetic operations, and thereby implement the butterfly arithmetic operation in an efficient manner.

The arithmetic operation unit 100C adopts the pipeline processing scheme which allows continuous implementation of the butterfly arithmetic operation in the pitch of two cycles. Thus, arithmetic efficiency in continuously implementing the butterfly arithmetic operation may be improved compared with the arithmetic operation unit 100ex of the comparative example illustrated in FIG. 9.

Figure 11:
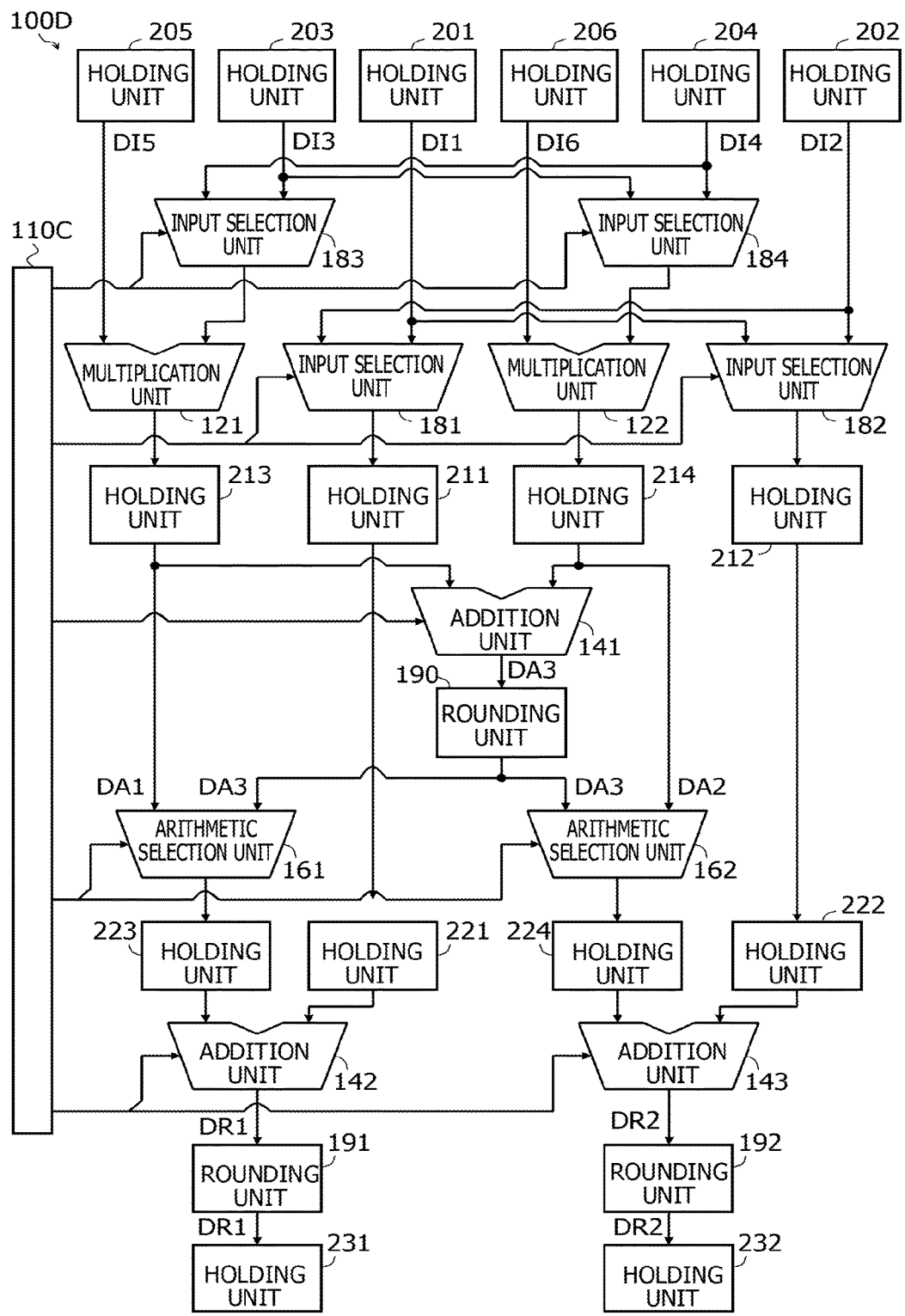
FIG. 11 illustrates another embodiment of an arithmetic operation unit and a method of controlling the arithmetic operation unit.

FIG. 11 illustrates an example of an arithmetic operation unit and a method of controlling the arithmetic operation unit. Elements identical or similar with elements described with reference to FIGS. 1 to 10 are assigned with identical or similar reference numerals, and detailed description thereof is omitted. An arithmetic operation unit 100D illustrated in FIG. 11 is configured to implement arithmetic operation using a plurality of input data DI (DI1, DI2, DI3, DI4, DI5, DI6) separately in a plurality of stages. More specifically, the arithmetic operation unit 100D adopts the pipeline processing scheme in the same manner as the arithmetic operation unit 100C. Although not illustrated in FIG. 11, the arithmetic operation unit 100D is included in the arithmetic processing device 10 that is a processor such as, for example, a CPU, in the same manner as the arithmetic operation unit 100 illustrated in FIG. 1.

The arithmetic operation unit 100D is identical or similar with the arithmetic operation unit 100C illustrated in FIG. 6 except that rounding units 190, 191, and 192 are added to the arithmetic operation unit 100C illustrated in FIG. 6. Operations of the arithmetic operation unit 100D are identical or similar with operations of the arithmetic operation unit 100C illustrated in FIG. 6 except rounding processing of rounding units 190, 191, and 192, and is described with reference to FIGS. 5, 7, and 8.

For example, the arithmetic operation unit 100D includes the controller 110C, multiplication units 121 and 122, addition units 141, 142, and 143, arithmetic selection units 161 and 162, input selection units 181, 182, 183, and 184, and holding units 201 to 206, 211 to 214, 221 to 224, and 231 to 232. Further, the arithmetic operation unit 100D includes rounding units 190, 191, and 192.

The rounding unit 190 is configured to round the precision of the mantissa part of arithmetic data DA3 that is an addition result of the addition unit 141, based on the precision of the mantissa part of input data DI. Therefore, arithmetic selection units 161 and 162 receive arithmetic data DA3 rounded by the rounding unit 190.

For example, if input data DI is a single-precision floating point number according to the Institute of Electrical and Electronics Engineers (IEEE) 754, the precision of the mantissa part is 24 bits. In this case, the precision of the multiplication result of, for example, the multiplication unit 121 is maximum 48 bits. Therefore, when the arithmetic operation unit 100D implements the product-sum operation, for example, arithmetic data DA1 that the addition unit 142 receives has a precision of 48 bits, and input data DI1 that the addition unit 142 receives has a precision of 24 bits. In this case, since arithmetic data DA3 that is output of the addition unit 141 is input of addition units 141 and 142, cost efficiency may be obtained in an efficient manner by rounding the precision of the mantissa part of arithmetic data DA3 to 48 bits. Therefore, when input data DI is a single-precision floating point number according to the IEEE 754, the rounding unit 190 rounds the precision of the mantissa part of arithmetic data DA3 to 48 bits.

When input data DI is a single-precision floating point number according to the IEEE 754, the rounding unit 190 may round the precision of the mantissa part of arithmetic data DA3 to 24 bits. This suppresses occurrence of dual roundings which are different from each other depending on whether results of rounding by rounding units 191 and 192 include a rounding by the rounding unit 190.

The rounding unit 191 is configured to round the precision of the mantissa part of arithmetic result data DR1 that is an addition result of the addition unit 142, based on the precision of the floating point number according to the IEEE 754. In the same manner, the rounding unit 192 is configured to round the precision of the mantissa part of arithmetic result data DR2 that is an addition result of the addition unit 143, based on the precision of the floating point number according to the IEEE 754. Thus, the holding unit 231 holds arithmetic result data DR1 rounded by the rounding unit 191, and the holding unit 232 holds arithmetic result data DR2 rounded by the rounding unit 192. Thus, the arithmetic operation unit 100D may implement, for example, the product-sum operation to a precision of the floating point number according to the IEEE 754.

Configuration of the arithmetic operation unit 100D is not limited to the example illustrated in FIG. 11. For example, rounding units 190, 191, and 192 may be added to any one of arithmetic operation units 100, 100A, and 100B illustrated in FIGS. 1, 3, and 4.

In FIG. 11, similar effects as in the embodiments illustrated in FIGS. 1 to 8 may be also obtained. For example, drop of the arithmetic efficiency in implementing an arithmetic operation other than the butterfly arithmetic operation may be suppressed, and at the same time, arithmetic efficiency in implementing the butterfly arithmetic operation may be improved. For example, the arithmetic efficiency of the arithmetic operation unit 100D may be improved. Further, the arithmetic operation unit 100D may implement, for example, the product-sum operation to a precision of the floating point number according to the IEEE 754 with rounding processing by rounding units 190, 191, and 192.

Figure 12:
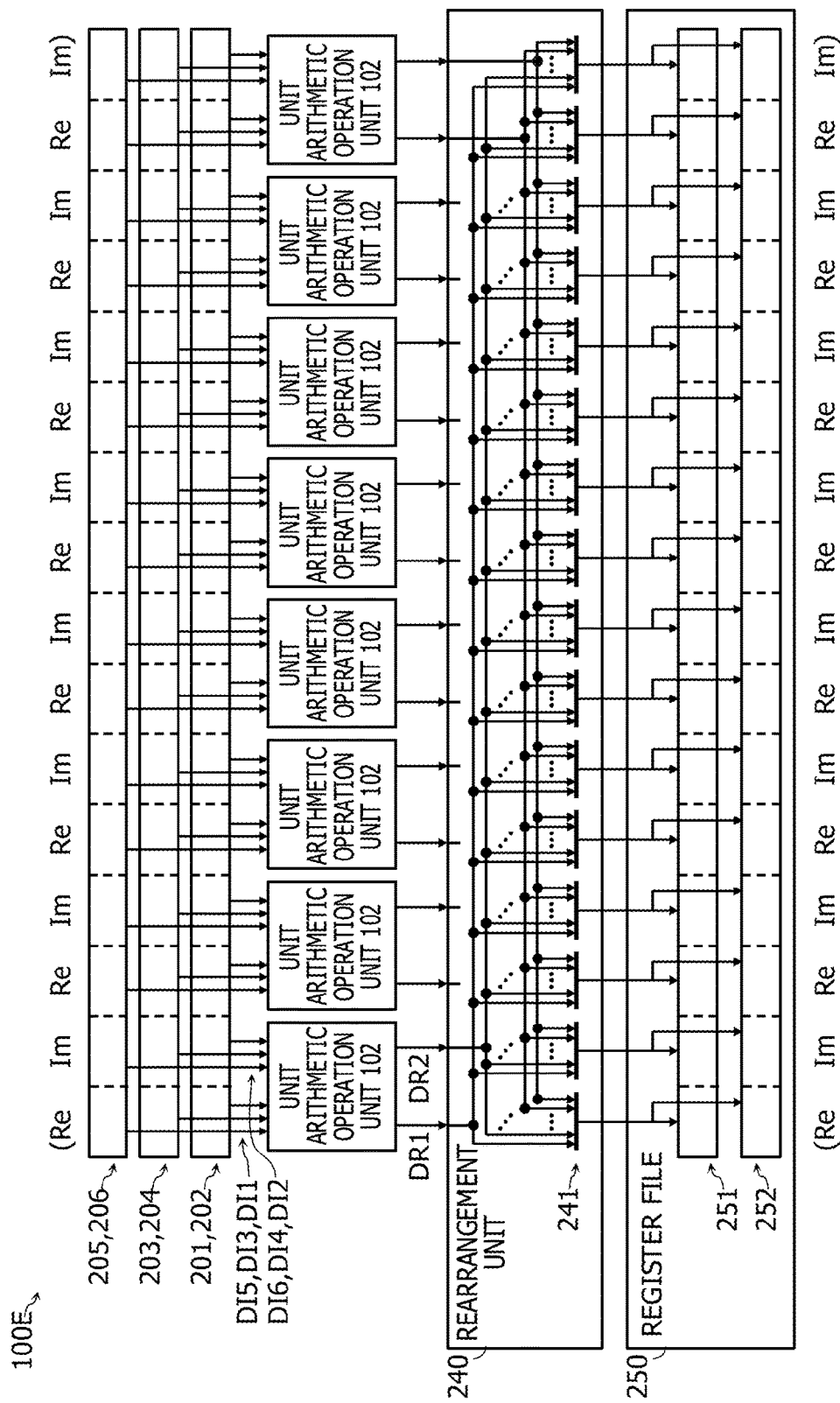
FIG. 12 illustrates another embodiment of an arithmetic operation unit and a method of controlling the arithmetic operation unit.

FIG. 12 illustrates an embodiment of an arithmetic operation unit and a method of controlling the arithmetic operation unit. Elements identical or similar with elements described with reference to FIGS. 1 to 11 are assigned with identical or similar reference numerals, and detailed description thereof is omitted. The arithmetic operation unit 100E illustrated in FIG. 12 is a Single Instruction Multiple Data (SIMD) arithmetic operation unit that implements arithmetic operations simultaneously based on one instruction. Although not illustrated in FIG. 12, the arithmetic operation unit 100E is included in the arithmetic processing device 10 that is a processor such as, for example, a CPU, in the same manner as the arithmetic operation unit 100 illustrated in FIG. 1.

The arithmetic operation unit 100E includes a plurality of unit arithmetic operation units 102 that implement arithmetic operations using a plurality of input data DI (DI1, DI2, DI3, DI4, DI5, DI6), holding units 201, 202, 203, 204, 205, and 206, and a rearrangement unit 240. Further, the arithmetic operation unit 100E includes a register file 250 configured to hold arithmetic result data DR1 and DR2 of each of the plurality of unit arithmetic operation units 102.

Configuration of each unit arithmetic operation units 102 is, for example, identical or similar with the arithmetic operation unit 100D illustrated in FIG. 11 except that holding units 201 to 206 are removed from the arithmetic operation unit 100D. For example, the unit arithmetic operation unit 102 includes a controller 110C, multiplication units 121 and 122, addition units 141, 142, and 143, arithmetic selection units 161 and 162, input selection units 181, 182, 183, and 184, rounding units 190, 191, and 192, and holding units 231 and 232, which are illustrated in FIG. 11. Holding units 201, 202, 203, 204, 205, 206 of the arithmetic operation unit 100D illustrated in FIG. 11 are holding units 201, 202, 203, 204, 205, and 206 illustrated in FIG. 12. A group of holding units including holding units 201, 202, 203, 204, 205, and 206 is provided for each unit arithmetic operation unit 102. More specifically, the arithmetic operation unit 100E includes a plurality of arithmetic operation units 100D, the rearrangement unit 240, and the register file 250.

The rearrangement unit 240 receives arithmetic result data DR1 and DR2 of each of the plurality of unit arithmetic operation units 102. Then, the rearrangement unit 240 stores arithmetic result data DR1 and DR2 received from the unit arithmetic operation units 102 into corresponding areas of registers 251 and 252 of the register file 250. For example, the rearrangement unit 240 includes a plurality of selectors 241 (for example, selectors 241 of the number two times the number of the plurality of unit arithmetic operation units 102). Each selector 241 receives arithmetic result data DR1 and DR2 of each of the plurality of unit arithmetic operation units 102, and stores any one of received arithmetic result data DR1 and DR2 into a corresponding area of registers 251 and 252. In FIG. 12, depiction of some signal lines in the rearrangement unit 240 is omitted for simplicity of the figure.

For example, by controlling the select operation of the arithmetic result data DR by the selector 241, the rearrangement unit 240 may rearrange arithmetic result data DR1 and DR2 received from the unit arithmetic operation units 102 and store into corresponding areas of registers 251 and 252. "Re" in brackets illustrated in FIG. 12 represents the real part of the complex number, and "Im" represents the imaginary part of the complex number. When implementing the butterfly arithmetic operation repeatedly, the rearrangement unit 240 rearranges arithmetic result data DR1 and DR2 of each of the plurality of unit arithmetic operation units 102 such that arrangement of the real part (Re) and the imaginary part (Im) are the same between input and output, and stores into the register file 250.

For example, as described with reference to FIG. 7, a pair of the data held respectively by holding units 231 and 232 are a pair of the real part of Fp and the real part of the Fm out of a pair of unit arithmetic operations Fp and Fm in the fourth cycle, and a pair of the imaginary part of the Fp and the imaginary part of Fm in the fifth cycle. In this case, arrangement of the real part and the imaginary part of the complex number is different between input and output of the unit arithmetic operation unit 102. For this reason, the rearrangement unit 240 rearranges arithmetic result data DR1 and DR2 such that the real part and the imaginary part of each of the pair of unit arithmetic operations Fp and Fm become a pair, and stores into the register file 250.

Figure 14:
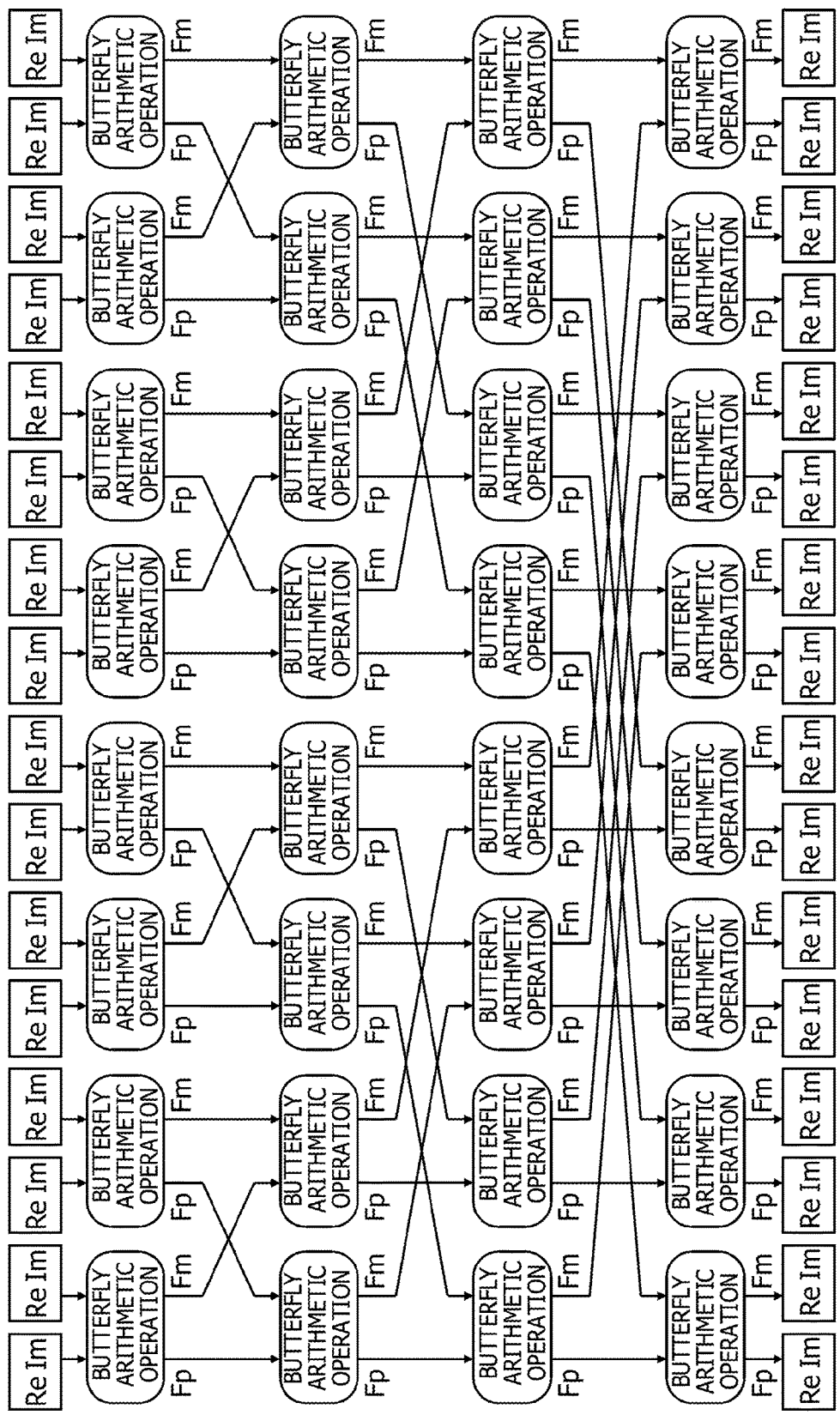
FIG. 14 illustrates an example of a data flow of a butterfly arithmetic operation in FFT at 16 points.

In the butterfly arithmetic operation in the FFT at N points (N is, for example, power of 2), input data DI of the unit arithmetic operation unit 102 in the butterfly arithmetic operation in the next stage may be arithmetic result data DR of a unit arithmetic operation unit 102 not adjacent thereto as illustrated in FIG. 14. For this reason, in preparation for input in the next stage, the arithmetic operation unit 100E causes the rearrangement unit 240 to rearrange arithmetic result data DR1 and DR2. Thus, arithmetic efficiency in repeatedly implementing the butterfly arithmetic operation may be improved.

Thus, when feeding back arithmetic result data DR1 and DR2 that the register file 250 holds into any one of a plurality of unit arithmetic operation units 102, the rearrangement unit 240 rearranges arithmetic result data DR1 and DR2 according to the feedback path. Thus, when the plurality of unit arithmetic operation units 102 repeatedly implement arithmetic operation by feeding back arithmetic result data DR, arithmetic result data DR1 and DR2 of each of the plurality of unit arithmetic operation units 102 are rearranged according to the feedback path and stored into the register file 250.

Rearrangement of arithmetic result data DR1 and DR2 by the rearrangement unit 240 is implemented, for example, by using an instruction to implement rearrangement, the instruction being packaged in the arithmetic processing device 10 including the arithmetic operation unit 100E.

Configuration of the arithmetic operation unit 100E is not limited to the embodiment illustrated in FIG. 12. For example, each of unit arithmetic operation units 102 may be the arithmetic operation unit 100 illustrated in FIG. 1, or may have a configuration of any one of arithmetic operation units 100A, 100B, and 100C illustrated in FIGS. 3, 4, and 6, with holding units 201 to 206 removed. Each of unit arithmetic operation units 102 may have a configuration of arithmetic operation units 100A, 100B, 100C, and 100D illustrated in FIGS. 3, 4, 6, and 11, with holding units 201 to 206, 231, and 232 removed. The number of unit arithmetic operation units 102 is not limited to eight.

Figure 13:
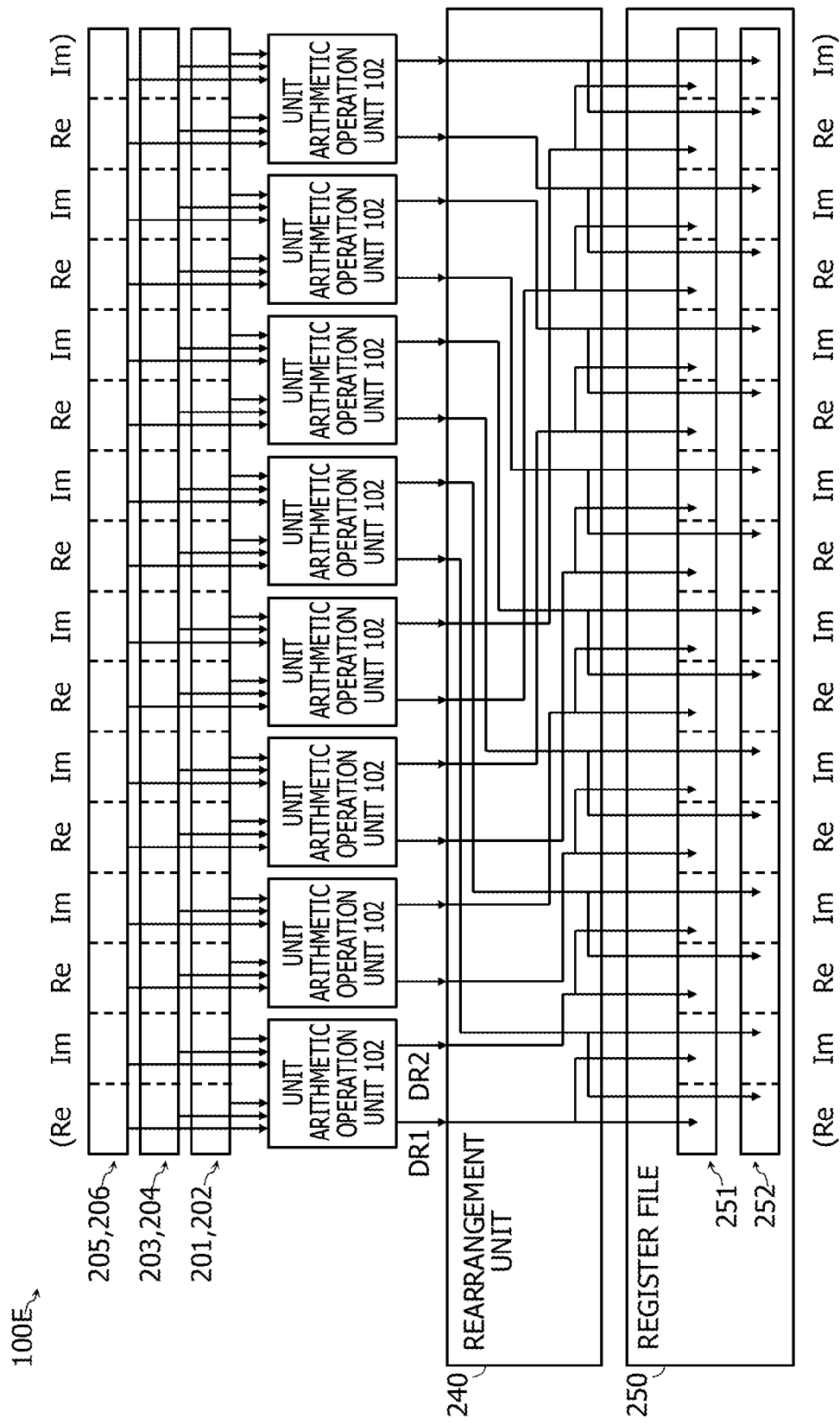
FIG. 13 illustrates an example of a rearrangement by a rearrangement unit illustrated in FIG. 12.

FIG. 13 illustrates an example of data rearrangement by the rearrangement unit illustrated in FIG. 12. Meaning of "Re" and "Im" illustrated in FIG. 13 is the same as "Re" and "Im" illustrated in FIG. 12.

As described with reference to, for example, FIG. 7, when implementing butterfly arithmetic operation, the arithmetic operation unit 100E stores the real part (Re) of the complex number into holding units 201, 203, and 205, and the imaginary part (Im) of the complex number into holding units 202, 204, and 206. For this reason, when storing arithmetic result data DR1 and DR2 into the register file 250, the rearrangement unit 240 rearranges arithmetic result data DR1 and DR2 such that the real part and the imaginary part of each of the pair of unit arithmetic operations Fp and Fm become a pair, and stores into the register file 250.

For example, as described with reference to FIG. 7, the holding unit 231 of the unit arithmetic operation unit 102 sequentially holds the real part and the imaginary part of Fp out of the pair of unit arithmetic operation units Fp and Fm as arithmetic result data DR1. In the same manner, the holding unit 232 of the unit arithmetic operation unit 102 sequentially holds the real part and the imaginary part of the Fm out of the pair of unit arithmetic operation units Fp and Fm as arithmetic result data DR2. For this reason, as illustrated in FIG. 13, the rearrangement unit 240 rearranges arithmetic result data DR1 and DR2 such that the real part and the imaginary part of each of the pair of unit arithmetic operations Fp and Fm become a pair, and stores into the register file 250. This facilitates to use arithmetic result data DR in, for example, the next butterfly arithmetic operation.

FIG. 14 illustrates an example of a data flow of the butterfly arithmetic operation in the FFT at 16 points. Meaning of "Re" and "Im" illustrated in FIG. 14 is the same as "Re" and "Im" illustrated in FIG. 12. In the example illustrated in FIG. 14, the arithmetic operation unit 100E implements eight butterfly arithmetic operations in two divided operations and allocates the first eight data and the second eight data out of outputted 16 arithmetic result data DR respectively to registers 251 and 252. For example, the arithmetic operation unit 100E causes the rearrangement unit 240 to control the transfer path (path indicated by arrow in FIG. 14) of arithmetic result data DR, and stores arithmetic result data DR into registers 251 and 252 of the register file 250. The arithmetic operation unit 100E outputs arithmetic result data DR stored in registers 251 and 252 of the register file 250 to holding units 201 to 206 and so on of the next butterfly arithmetic operation. Alternatively, the arithmetic operation unit 100E branches the path of output from the rearrangement unit 240 and outputs arithmetic result data DR to holding units 201 to 206 of the next butterfly arithmetic operation.

As illustrated in FIG. 14, for example, a distortion occurs in input/output of data between a first-stage butterfly arithmetic operation (uppermost butterfly arithmetic operation in FIG. 14) and a second-stage butterfly arithmetic operation. For this reason, as illustrated in FIG. 15, the rearrangement unit 240 rearranges arithmetic result data DR to dissolve the distortion in input/output between the first-stage butterfly arithmetic operation and the second-stage butterfly arithmetic operation.

When registers 251 and 252 have a register length capable of storing eight pairs of data, element positions (storage area) of registers 251 and 252 in a portion between a third-stage butterfly arithmetic operation and a fourth-stage butterfly arithmetic operation is the same as the state where no distortion occurs. For this reason, although in a data flow illustrated in FIG. 14, a distortion occurs in input/output of data between the third-stage butterfly arithmetic operation and the fourth-stage butterfly arithmetic operation, arithmetic result data DR1 and DR2 may be rearranged as illustrated in FIG. 13 to dissolve the distortion. For example, by register numbers specified as input into the fourth-stage butterfly arithmetic operation to corresponding numbers, data may be rearranged as illustrated in FIG. 13.

Apart from first two distortions illustrated in FIG. 14, in the butterfly arithmetic operation in the FFT at N points (for example, N is the power of 2), larger the N, larger the number of cases where the distortion may be dissolved by data rearrangement illustrated in FIG. 13 increases.

Figure 15:
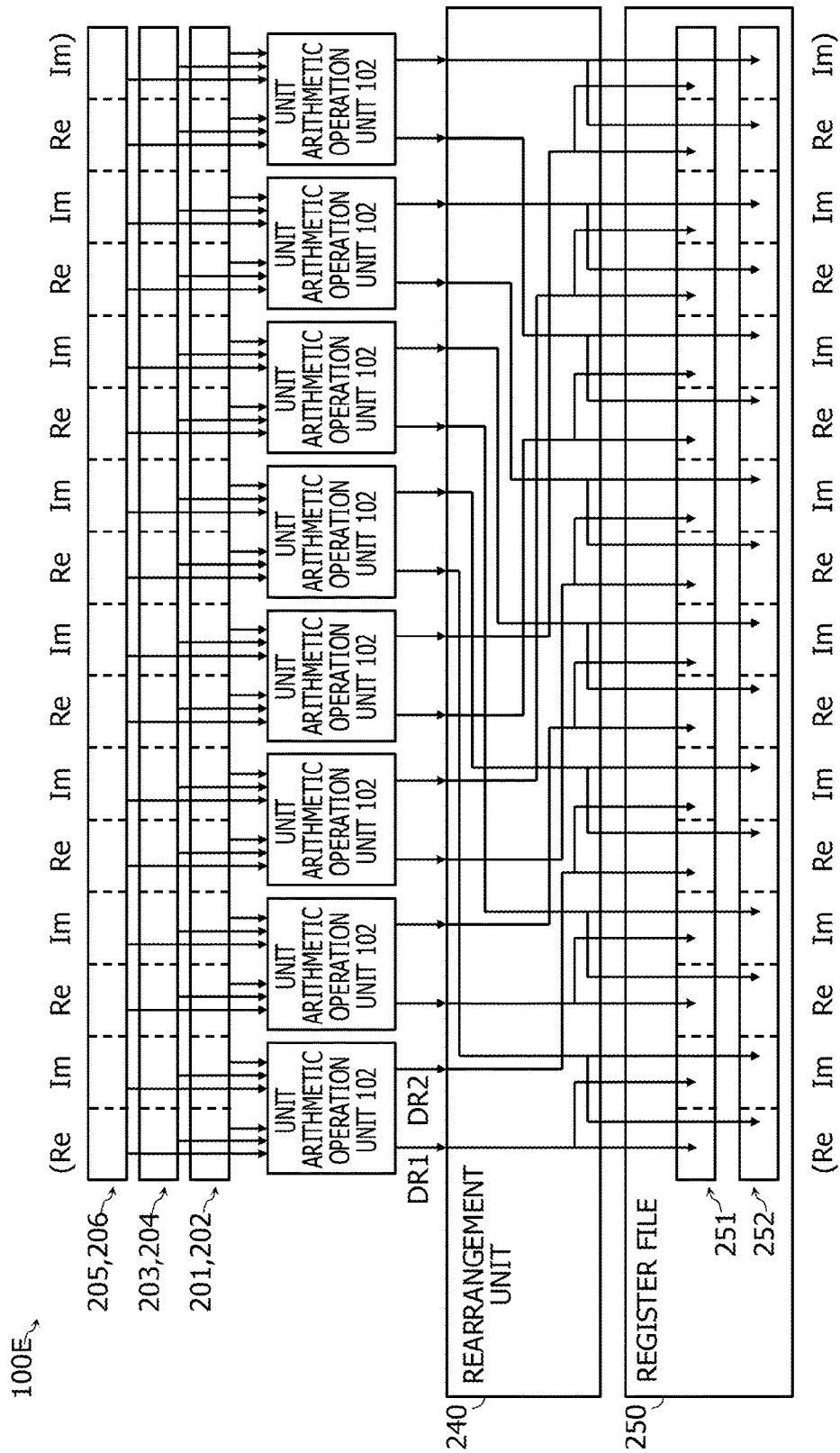
FIG. 15 illustrates an example of the rearrangement by the rearrangement unit illustrated in FIG. 12.

FIG. 15 illustrates another example of data rearrangement by the rearrangement unit 240 illustrated in FIG. 12. Meaning of "Re" and "Im" illustrated in FIG. 15 is the same as "Re" and "Im" illustrated in FIG. 12. As illustrated in FIG. 14, depending on the stage of the butterfly arithmetic operation, data requested for a next butterfly arithmetic operation may be a separate element that is stored into registers 251 and 252 in the same manner as the result of the preceding butterfly arithmetic operation. For this reason, the arithmetic operation unit 100E causes the rearrangement unit 240 to rearrange arithmetic result data DR1 and DR2 of the unit arithmetic operation unit 102 to dissolve the distortion in input/output of data. The data path illustrated in FIG. 15 is a data path in which arithmetic result data DR1 and DR2 are rearranged so as to dissolve the distortion in input/output of data between the first-stage butterfly arithmetic operation and the second-stage butterfly arithmetic operation, illustrated in FIG. 14.

As described above, even in FIGS. 12 to 15, similar effects as in the embodiments illustrated in FIGS. 1 to 11 may be also obtained. For example, drop of the arithmetic efficiency in implementing an arithmetic operation other than the butterfly arithmetic operation may be suppressed, and at the same time, the arithmetic efficiency in implementing the butterfly arithmetic operation may be improved. More specifically, the arithmetic efficiency of the arithmetic operation unit 100E may be improved. When implementing, for example, butterfly arithmetic operation in the FFT at N points (N is, for example, the power of 2), the arithmetic operation unit 100E causes the rearrangement unit 240 to rearrange arithmetic result data DR1 and DR2 and stores into the register file 250. This facilitates to use arithmetic result data DR in, for example, the next butterfly arithmetic operation.

Figure 16:
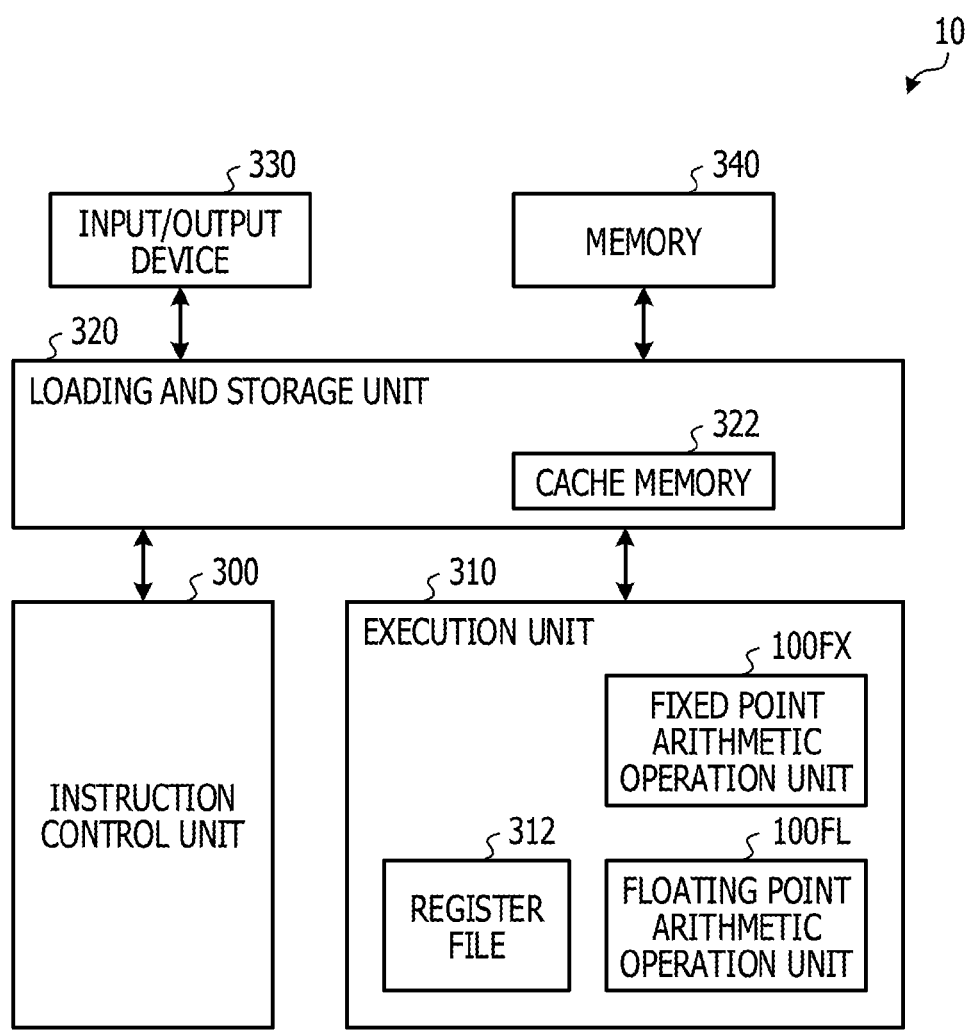
FIG. 16 illustrates an example of an arithmetic processor device including arithmetic operation units.

FIG. 16 illustrates an example of an arithmetic processing device including arithmetic operation units. An arithmetic processing device 10 includes an instruction control unit 300, an execution unit 310, a loading and storage unit 320, an input/output device 330, and a memory 340.

The instruction control unit 300 is configured to, for example, decode an instruction and output decoded instruction to the execution unit 310 and the loading and storage unit 320. The execution unit 310 is configured to execute the instruction (decided instruction) received from the instruction control unit 300. For example, the execution unit 310 includes a register file 312, a fixed point arithmetic operation unit 100FX, and floating point arithmetic operation unit 100FL.

The register file 312 holds data (for example, input data DI) used by the fixed point arithmetic operation unit 100FX and the floating point arithmetic operation unit 100FL. The fixed point arithmetic operation unit 100FX is configured to implement arithmetic operation of the fixed point number. For example, the fixed point arithmetic operation unit 100FX is any one of arithmetic operation units 100, 100A, 100B, 100C, and 100E illustrated in FIGS. 1, 3, 4, 6, and 12. In this case, each of multiplication units 121 and 122 and addition units 141, 142, and 143 illustrated, for example, in FIG. 1, executes arithmetic operation of the fixed point number. The floating point arithmetic operation unit 100FL is configured to implement arithmetic operation of the floating point number. For example, the floating point arithmetic operation unit 100FL is any one of arithmetic operation units 100, 100A, 100B, 100C, 100D, and 100E illustrated in FIGS. 1, 3, 4, 6, 11, and 12. In this case, each of multiplication units 121 and 122 and addition units 141, 142, and 143 illustrated, for example, in FIG. 1, executes arithmetic operation of the floating point number.

For example, when any one of the fixed point arithmetic operation unit 100FX and the floating point arithmetic operation unit 100FL is the arithmetic operation unit 100E illustrated in FIG. 12, a portion of the register file 312 corresponds to the register file 250 illustrated in FIG. 12.

The loading and storage unit 320 implements loading or storing of data into the input/output device 330 and the memory 340 respectively based on the instruction (decoded instruction) received from the instruction control unit 300. For example, the loading and storage unit 320 include a cache memory 322. The cache memory 322 is configured to hold a portion of data that the memory 340 stores. Data that the cache memory 322 holds is used by the execution unit 310.

The input/output device 330 is, for example, an input device such as, for example, a keyboard through which data is entered into the arithmetic processing device 10, and an output device such as, for example, a display through which the processing result of the arithmetic processing device 10 is outputted to the outside. The memory 340 is, for example, a main storage device in a layer lower than the cache memory 322.

Thus, in the arithmetic processing device 10, an arithmetic operation unit such as, for example, the fixed point arithmetic operation unit 100FX and the floating point arithmetic operation unit 100FL implements, for example, product-sum operation and butterfly arithmetic operation by accessing to, for example, the register file 312. Here, in the miniaturization in the semiconductor integrated circuit, reduction rate of the wiring is lower than reduction rate of the transistor. Therefore, in the peripheral packaging design of the arithmetic operation unit, the wiring, especially, a bus for connecting, for example, the register file 312 to the arithmetic operation unit is a bottle neck in reducing the size. In other words, even when the addition unit 141 and arithmetic selection units 161 and 162 illustrated in, for example, FIG. 1 are added to the arithmetic operation unit 100ex illustrated in FIG. 9, the number of wirings for input and output of the arithmetic operation unit does not increase, and thus, there is almost no influences on the area cost. More specifically, arithmetic operation units 100, 100A, 100b, 100C, 100D, and 100E illustrated in FIGS. 1, 3, 4, 6, 11, and 12 improve the arithmetic efficiency compared with conventional arithmetic operation units without giving little influences on the area cost of the arithmetic processing device 10. Configuration of the arithmetic processing device 10 including an arithmetic operation unit is not limited to the example illustrated in FIG. 16.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic operation unit comprising:
   a first multiplier configured to multiply two first input data to calculate first arithmetic data;
   a second multiplier configured to multiply two second input data to calculate second arithmetic data;
   a first adder configured to add the first arithmetic data and the second arithmetic data to calculate third arithmetic data;
   a first arithmetic selector configured to select one of the first arithmetic data and the third arithmetic data;
   a second arithmetic selector configured to select one of the second arithmetic data and the third arithmetic data;
   a second adder configured to add third input data and arithmetic data selected by the first arithmetic selector to calculate first arithmetic result data;
   a third adder configured to add input fourth data and arithmetic data selected by the second arithmetic selector to calculate second arithmetic result data;
   a plurality of memories configured to hold a plurality of input data including the two first inputs data, the two second input data, the third input data and the fourth input data, respectively; and
   an input selector configured to select input data to be used by the third adder out of the third input data and the fourth input data received respectively from two memories of the plurality of memories, wherein the second adder is configured to add input data held by one of the two memories and arithmetic data selected by the first arithmetic selector to calculate the first arithmetic result data,
   when implementing butterfly arithmetic operation, the first arithmetic selector outputs the third arithmetic data received from the first adder to the second adder; the second arithmetic selector outputs the third arithmetic data received from the first adder to the third adder; and the input selector outputs input data received from one of the two memories to the third adder, and when implementing product-sum operation, the first arithmetic selector outputs the first arithmetic data received from the first multiplier to the second adder; the second arithmetic selector outputs the second arithmetic data received from the second multiplier to the third adder; and the input selector outputs input data received from the other one of the two memories to the third adder.

2. The arithmetic operation unit according to claim 1, further comprising:
   a plurality of memories configured to hold a plurality of input data including the two first inputs data, the two second input data, the third input data and the fourth input data, respectively;
   a first input selector configured to select input data to be used by the second adder out of two input data received respectively from a first memory and a second memory out of the plurality of memories;
   a second input selector configured to select input data to be used by the third adder out of two input data respectively received from the first memory and the second memory;
   a third input selector configured to select input data to be used by the first multiplier out of two input data received respectively from a third memory and a fourth memory out of the plurality of memories; and
   a fourth input selector configured to select input data to be used by the second multiplier out of two input data received respectively from the third memory and the fourth memory, wherein the first multiplier is configured to multiply input data received from a fifth memory out of the plurality of memories and input data received from the third input selector to calculate the first arithmetic data, the second multiplier is configured to multiply input data received from a sixth memory out of the plurality of memories and input data received from the fourth input selector to calculate the second arithmetic data, the second adder is configured to add input data received from the first input selector and arithmetic data received from the first arithmetic selector to calculate the first arithmetic result data, and the third adder is configured to add input data received from the second input selector and arithmetic data received from the first arithmetic selector to calculate the second arithmetic result data.

3. The arithmetic operation unit according to claim 2, wherein when implementing one butterfly arithmetic operation in two divided operations, the first input selector is configured to alternately output input data received from the first memory and input data received from the second memory to the second adder in a first arithmetic operation and a second arithmetic operation; the second input selector is configured to output, to the third adder, input data identical with input data that the first input selector outputs to the second adder, out of input data received from the first memory and input data received from the second memory; the third input selector is configured to alternately output input data received from the third memory and input data received from the fourth memory to the first multiplier in the first arithmetic operation and the second arithmetic operation; the fourth input selector is configured to output, to the second multiplier, input data different from input data that the third input selector outputs to the first multiplier, out of input data received from the third memory and input data received from the fourth memory; the first arithmetic selector is configured to output the third arithmetic data received from the first adder to the second adder; and the second arithmetic selector is configured to output the third arithmetic data received from the first adder to the third adder, and when implementing product-sum operation, the first input selector is configured to output input data received from the first memory to the second adder; the second input selector is configured to output input data received from the second memory to the third adder; the third input selector is configured to output input data received from the third memory to the first multiplier; the fourth input selector is configured to output input data received from the fourth memory to the second multiplier; the first arithmetic selector is configured to output the first arithmetic data received from the first multiplier to the second adder; and the second arithmetic selector is configured to output the second arithmetic data received from the second multiplier to the third adder.

4. The arithmetic operation unit according to claim 1, wherein each of the first multiplier, the second multiplier, the first adder, the second adder, and the third adder is configured to implement arithmetic operation of the floating point number.

5. The arithmetic operation unit according to claim 4, further comprising:
   a rounder configured to round precision of a mantissa part of addition result of the first adder based on precision of a mantissa part of input data.

6. The arithmetic operation unit according to claim 1, further comprising:
   a plurality of unit calculators including the first multiplier, the second multiplier, the first adder, the second adder, and the third adder;
   a register file configured to hold the first arithmetic result data and the second arithmetic result data of each of the plurality of unit calculators s; and
   a rearrangement part configured to rearrange, according to a feedback path, the first arithmetic result data and the second arithmetic result data of each of the plurality of unit calculators and store the first arithmetic result data and the second arithmetic result data into the register file when the first arithmetic result data and the second arithmetic result data that the register file holds are fed back to any one of the plurality of unit calculators and the plurality of unit calculators repeatedly implement arithmetic operation.

7. A method of controlling an arithmetic operation unit, comprising:
   causing a first multiplier of the arithmetic operation unit to multiply two input data to calculate first arithmetic data; causing a second multiplier of the arithmetic operation unit to multiply two input data to calculate second arithmetic data;
   causing a first adder of the arithmetic operation unit to add the first arithmetic data and the second arithmetic data to calculate third arithmetic data;
   causing a first arithmetic selector of the arithmetic operation unit to select any one of the first arithmetic data and the third arithmetic data;
   causing a second arithmetic selector of the arithmetic operation unit to select any one of the second arithmetic data and the third arithmetic data;
   causing a second adder of the arithmetic operation unit to add input data and arithmetic data selected by the first arithmetic selector to calculate first arithmetic result data;
   causing a third adder of the arithmetic operation unit to add input data and arithmetic data selected by the second arithmetic selector to calculate second arithmetic result data;
   causing a plurality of memories to hold a plurality of input data including the two first inputs data, the two second input data, the third input data and the fourth input data, respectively; and
   causing an input selector to select input data to be used by the third adder out of the third input data and the fourth input data received respectively from two memories of the plurality of memories, wherein the second adder is configured to add input data held by one of the two memories and arithmetic data selected by the first arithmetic selector to calculate the first arithmetic result data,
   when implementing butterfly arithmetic operation, the first arithmetic selector outputs the third arithmetic data received from the first adder to the second adder; the second arithmetic selector outputs the third arithmetic data received from the first adder to the third adder; and the input selector outputs input data received from one of the two memories to the third adder, and when implementing product-sum operation, the first arithmetic selector outputs the first arithmetic data received from the first multiplier to the second adder; the second arithmetic selector outputs the second arithmetic data received from the second multiplier to the third adder; and the input selector outputs input data received from the other one of the two memories to the third adder.

* * * * *